United States Patent [19]
Hoium et al.

[11] Patent Number: 6,012,621
[45] Date of Patent: Jan. 11, 2000

[54] CABLE CONVEYING APPARATUS

[75] Inventors: Jonathan A. Hoium, North Mankato; Jason A. Bruns, Mankato, both of Minn.

[73] Assignee: Condux International, Inc., Mankato, Minn.

[21] Appl. No.: 08/923,361

[22] Filed: Sep. 4, 1997

[51] Int. Cl.[7] .......................... B65H 23/16; B65H 20/00; B65H 59/00
[52] U.S. Cl. ......................... 226/35; 226/172; 254/134.4
[58] Field of Search .................................. 226/11, 12, 33, 226/35, 100, 172; 254/134.4

[56] References Cited

U.S. PATENT DOCUMENTS

| | | |
|---|---|---|
| 3,793,732 | 2/1974 | Hamrick . |
| 3,870,280 | 3/1975 | Victor . |
| 4,185,809 | 1/1980 | Jonnes . |
| 4,285,454 | 8/1981 | Plumettaz . |
| 4,469,267 | 9/1984 | Franchuk et al. ........................ 226/172 |
| 4,691,896 | 9/1987 | Reeve et al. . |
| 4,740,053 | 4/1988 | Cassidy . |
| 4,773,628 | 9/1988 | Aleshire . |
| 4,783,054 | 11/1988 | Morel et al. . |
| 4,796,970 | 1/1989 | Reeve et al. . |
| 4,822,005 | 4/1989 | Aleshire . |
| 4,840,352 | 6/1989 | Ellis . |
| 4,848,734 | 7/1989 | Ford . |
| 4,850,569 | 7/1989 | Griffioen et al. . |
| 4,934,662 | 6/1990 | Griffioen et al. . |
| 4,941,774 | 7/1990 | Harmstorf . |
| 4,948,097 | 8/1990 | Reeve et al. . |
| 4,990,033 | 2/1991 | Handley et al. . |
| 5,022,634 | 6/1991 | Keeble . |
| 5,121,644 | 6/1992 | Grey et al. . |
| 5,121,901 | 6/1992 | Cassidy et al. . |
| 5,123,075 | 6/1992 | Renton . |
| 5,143,353 | 9/1992 | Sano et al. . |
| 5,156,376 | 10/1992 | Spicer . |
| 5,163,657 | 11/1992 | Sano et al. . |
| 5,165,662 | 11/1992 | Jenkins . |

(List continued on next page.)

FOREIGN PATENT DOCUMENTS

| | | |
|---|---|---|
| 001 299 U1 | 2/1997 | Austria . |
| 0 287 225 | 10/1988 | European Pat. Off. . |
| 0 442 626 A2 | 8/1991 | European Pat. Off. . |
| 0 467 463 A1 | 1/1992 | European Pat. Off. . |
| 2 157 019A | 10/1985 | United Kingdom . |
| WO 92/17927 | 10/1992 | WIPO . |

OTHER PUBLICATIONS

Condux International Inc. User's Guide & Safety Manual for Electric Cable Pusher, 19 pages and back cover page, copyright 1994.

Condux International, Inc. brochure entitled "Outside Plant," 4 pages, copyright 1995.

(List continued on next page.)

*Primary Examiner*—Michael R. Mansen
*Attorney, Agent, or Firm*—Merchant & Gould P.C.

[57] ABSTRACT

A cable conveying apparatus and method installs a cable in conduit by the application of a pushing force generated by a drive assembly. The speed of the cable and the speed of the drive assembly are monitored wherein the drive assembly is shut off when the drive assembly and cable speeds exceed a predetermined difference. The cable conveying apparatus includes a blower, and a missile attached to the lead end of the cable, wherein the missile sealably and slideably engages the conduit such that the blower and missile combine to generate a pull force on the cable which cooperates with the pushing force of the drive assembly so as to install the cable in the conduit. The cable conveying apparatus also includes a high speed cable shut off system, and a low speed cable shut off system. The drive assembly includes two opposed continuous chains each including a plurality of cable engaging pads, and each driven by a hydraulic motor. A hydraulic cylinder preferably holds the drive chains at a spaced apart distance.

9 Claims, 22 Drawing Sheets

U.S. PATENT DOCUMENTS

| | | |
|---|---|---|
| 5,169,126 | 12/1992 | Reeve et al. . |
| 5,181,271 | 1/1993 | Jenkins . |
| 5,197,715 | 3/1993 | Griffioen . |
| 5,199,689 | 4/1993 | Proud et al. . |
| 5,205,542 | 4/1993 | Keeble . |
| 5,211,377 | 5/1993 | Griffioen et al. . |
| 5,234,198 | 8/1993 | Hale et al. . |
| 5,263,686 | 11/1993 | Sano et al. . |
| 5,308,041 | 5/1994 | Griffioen et al. . |
| 5,328,155 | 7/1994 | Sano et al. . |
| 5,358,218 | 10/1994 | Terasawa et al. . |
| 5,405,069 | 4/1995 | Duncan et al. ............... 226/33 X |
| 5,456,450 | 10/1995 | Reeve et al. . |
| 5,467,968 | 11/1995 | Proud et al. . |
| 5,474,277 | 12/1995 | Griffioen . |
| 5,499,797 | 3/1996 | Sano et al. . |
| 5,558,465 | 9/1996 | Pecot et al. . |
| 5,573,225 | 11/1996 | Boyle et al. . |
| 5,645,267 | 7/1997 | Reeve et al. . |
| 5,810,235 | 9/1998 | Hoynant et al. ............ 226/100 X |
| 5,813,658 | 9/1998 | Kaminski et al. ............ 254/134.4 |
| 5,897,103 | 4/1999 | Griffioen et al. ............ 254/134.4 |

OTHER PUBLICATIONS

Condux International, Inc. brochure entitled "Fiber Optic Cable Puller," 6 pages, copyright 1995.

Condux International, Inc. brochure entitled "Winch Line Blower," 6 pages, copyright 1991.

Condux International, Inc. 1997 catalog entitled "Cable Installation Equipment & Tools," front cover, and 2 back cover pages, and pp. 12–19, copyright 1997.

Sherman & Reilly, Inc. brochure entitled "The World's Most Advanced Cable Placing Systems," 6 pages.

Sherman & Reilly, Inc./Plumettaz literature entitled "Cablejet," 28 pages.

Plumettaz S.A. brochure entitled "Cablejet Superjet,", 4 pages.

Plumettaz S.A. brochure entitled "From Vineyards . . . ," 2 pages.

Plumettaz S.A. brochure entitled "Optical fibre cable laying equipment," 2 pages.

Quick Reference Guide for Fiber Optic Cable Installation System from Sherman & Reilly, Inc., 49 pages, dated 1994.

Cablejet/Superjet Field Trial/Demo Information from Sherman & Reilly, Inc., 3 pages.

Guidelines for using Arnco's Air–Trak™ at 400 Compressed Air Assisted Cable Push/Pull System, 14 pages, dated Mar. 1995.

Winching Equipment Product Bulletin from Arnco Corporation, 2 pages.

Otto–Kabelverlegemaschinen und Pumpentechnik brochure entitled "Cable Laying Machines," 4 pages, datged May 1993.

Otto–Products For Industry Hamburg–International document, 41 pages.

Vikimatic Sales, Inc. brochure entitled "Cable Blowing Equpment," 4 pages, copyright 1994.

Guidelines & Instructions for Cable Blowing With the Lancier™ PKR–60 from Vikimatic Sales, Inc., 8 pages, copyright 1995.

Bagela–Baumaschinen GmbH & Co. brochure entitled "Cable Bolow–In Device PIPE JET 2000," 2 pages, dated Mar. 1994.

Operating Instructions for Cabling Caterpillar Type PKR 60 from Peter Lancier GmbH KG, 16 pages.

Spare Parts & Connection Diagrams for Cabling Caterpillar type PKR 60 from Peter Lancier GmbH & Co. KG, 4 pages.

Peter Lancier GmbH & Co. KG literature entitled "Tools and equpment for laying fibre optic cables," 10 pages.

Lancier brochure entitled "Fiber Launch System", 4 pages.

Lancier brochure entitled "The new fiber–optic cable powered roller HKR 200," 2 pages, dated Mar. 1989.

W. Griffioen document entitled "Installation of optical cables in ducts," 147 pages.

Article entitled "The Blown Fiber Cable," from EEE Journal on Selected Areas In Communications, vol. Sac–4, No. 5, Aug. 1986, 7 pages.

CABLE CONVEYING APPARATUS

FIELD OF THE INVENTION

The present invention relates to apparatus and methods for installing cable, such as fiber optic communications cable, in duct or other conduit, such as underground duct.

BACKGROUND OF THE INVENTION

Various techniques are known for installing cable in duct or other conduit, which can be underground, above ground or in buildings. Sometimes the underground duct is known as "innerduct." A first technique is to pull the cable through conduit with a previously positioned wire or string attached to a lead end of the cable.

The use of high speed moving air to drag a lightweight and flexible optical fiber member through the conduit is also known, such as described in U.S. Pat. No. 4,691,896, to Reeves et al. According to Reeves et al., the high speed air creates a fluid drag force distributed along the optical fiber member in order to pull the optical fiber member through the conduit.

U.S. Pat. Nos. 4,850,569 and 4,934,662 to Griffioen et al. describe combining high speed air flow with a pushing force applied at the entry end of the conduit to install the cable. U.S. Pat. Nos. 5,197,715 and 5,474,277 to Griffioen further describe the use of a leaky missile attached to the lead end of the cable which adds a tension force on the lead end of the cable, in addition to the motive forces applied to the cable via the high speed moving air.

The use of pressurized air in combination with a sealed missile, parachute or other device for creating a pressure difference at the lead end of the cable is also known. The pressure difference creates a pushing force on the missile or other device, which pulls the lead end of cable through the conduit.

Various concerns arise when cable is installed in conduit. One concern is the ease of installation. A further concern is avoidance of damage to the cable during installation. Damage can occur in a variety of ways including: 1) crushing the cable with the installation equipment in the diametral direction; 2) causing the cable to have bending damage or column damage (may be referred to as "accordion damage") due to an excessive force applied in the longitudinal direction; and 3) damaging the protective cable jacket, such as by wearing, shredding or cutting the outer protective layer. Another concern is to minimize the amount of time needed to install the cable. Also, there is a concern to avoid splices in the cable as much as possible. Splices are time consuming to make, and may lead to a decrease in cable performance. Therefore, it is desirable to install the longest continuous length of cable possible to reduce the number of splices needed for the desired cable run.

There is a need in the prior art for further systems and methods which address the above-identified concerns, and other concerns.

SUMMARY OF THE INVENTION

The present invention concerns an apparatus for conveying a cable, such as through a conduit, in order to install the cable in the conduit. The apparatus is useful for installing fiber optic cable in underground duct, for example. A cable drive assembly frictionally engages an outside surface of the cable and applies a pushing force on the cable for insertion of the cable into the conduit. A drive assembly speed signal generator and a cable speed signal generator produce signals processed by a control system. Cable speed and drive assembly speed are monitored by the control system such that if the drive assembly exceeds a predetermined faster speed relative to the cable, the drive assembly will be stopped. Monitoring relative speeds is particularly useful in preventing cable jacket damage, such as might occur if the drive assembly is slipping and moving too fast relative to the cable, or when the cable has stopped due to an obstruction in the conduit, causing column or accordion damage.

Preferably, the cable drive assembly is used in combination with a cable blower assembly, and a sealed missile sealably and slideably engaged with an inner wall surface of the conduit. The cable blower and the missile create a pressure difference at the lead end of the cable, thereby creating a pull force on the cable. The combination of the cable drive assembly, and the missile and the cable blower assembly permits convenient installation of the cable in conduit, such as underground duct.

Preferably, the control system includes a high speed cable shut off system, and a low speed cable shut off system, both of which shut off the drive assembly when the speed of the cable either exceeds a certain predetermined maximum, or falls below a certain predetermined minimum.

In the preferred embodiment, the cable drive assembly includes two opposed tractor drive assemblies, each including a continuous chain and a plurality of cable engaging pads made from plastic and mounted to the chain. Preferably, the tractor drive assemblies are driven by hydraulic motors. In the preferred embodiment, the tractor drive assemblies are positioned at a predetermined spaced apart distance, and place a predetermined pressure on the cable, by the use of a hydraulic clamp cylinder. The clamp cylinder moves one tractor drive assembly toward and away from the other tractor drive assembly, as desired by the operator. The clamp cylinder allows a desired normal force to be placed on the cable by the tractor drive assemblies, so as to apply the proper frictional force to drive the cable forward, and yet not exceed the compressive limits of the cable. Hydraulics allow such normal force to be preset, and consistently repeated during operation.

The present invention also relates to a method of installing cable in a conduit including the steps of providing a drive assembly for moving the cable in a forward direction, generating a first signal indicative of movement of the drive assembly, and generating a second signal indicative of movement of the cable. The method further includes the steps of comparing the first and second signals over time, and generating a drive assembly shut off signal if relative speeds of the drive assembly and the cable exceed a predetermined difference. The method preferably includes providing the cable with a sealed missile sealably and slideably engaged with an inner wall of the conduit, and further applying air pressure to the missile so as to cause the missile to generate a pull force on the cable. The method also preferably includes monitoring cable high speed and low speed conditions, and generating a drive assembly shut off signal if the cable speed exceeds a predetermined maximum or falls below a predetermined minimum.

DETAILED DESCRIPTION OF THE PREFERRED EMBODIMENTS

Figure 1:
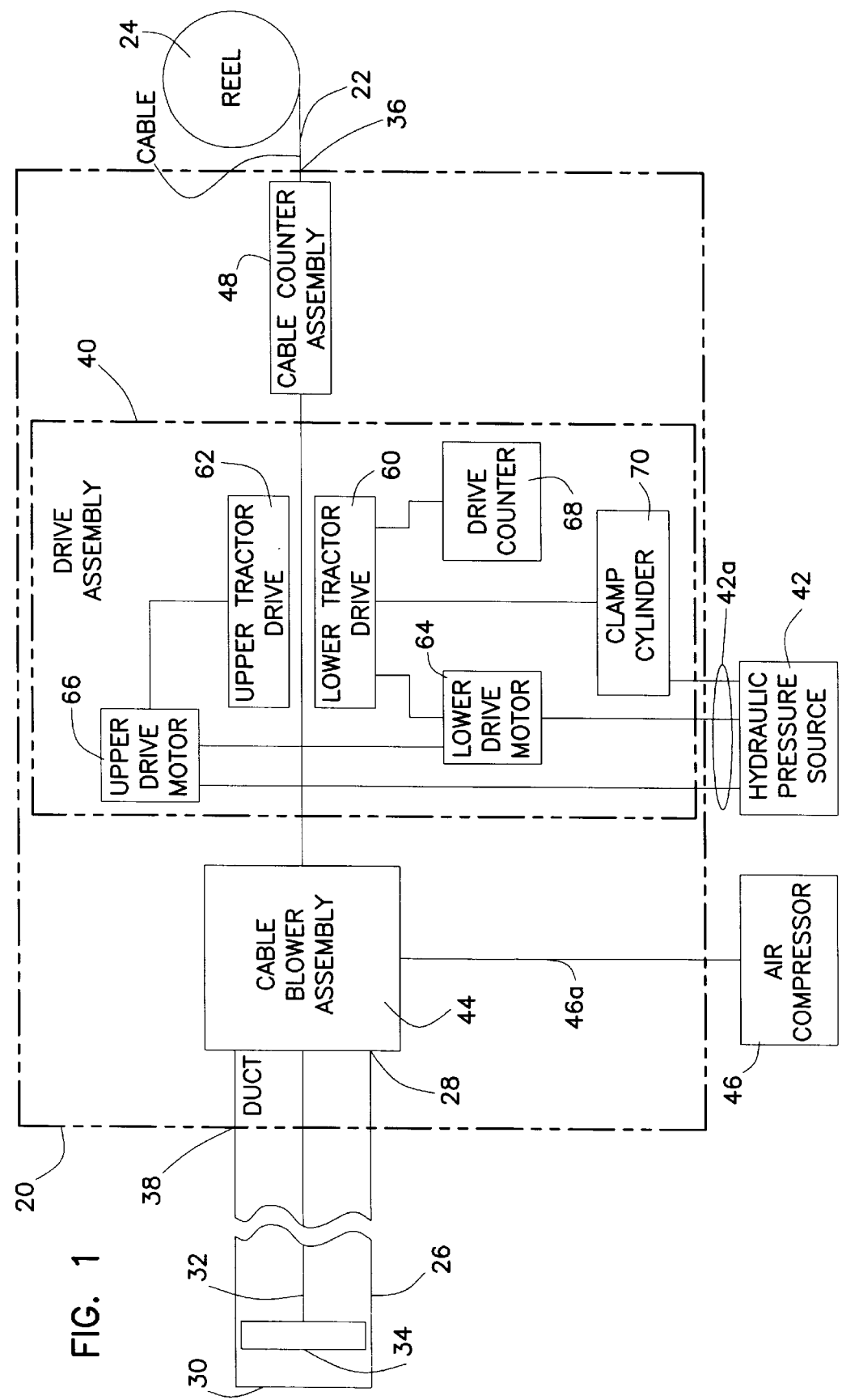
FIG. 1 is a schematic drawing of a cable conveying apparatus in accordance with the present invention showing cable being installed into a duct with the apparatus.

The present invention generally concerns a cable conveying apparatus and method which generates a motive force and applies the force to a cable for use in installing the cable in a conduit. Preferably, the motive force is a pushing force developed by a drive assembly which frictionally engages the cable at the entry end of the conduit. The cable conveying apparatus and method of the present invention preferably generates a further motive force on the cable by blowing a missile attached to an end of the cable through the conduit. Such motive pulling force in combination with the motive pushing force from the drive assembly can be utilized to install cable, such as fiber optic cable, in duct or other conduit, such as underground innerduct.

By monitoring the motive forces and the speeds of the system components, damage to the cable is reduced or avoided, and a properly performing cable can be installed. For example, compressive force damage in the diametral direction of the cable ("crushing") and column damage can be reduced or avoided by monitoring the normal force applied by the cable drive assembly. By also monitoring the speeds of the cable drive assembly and the cable, it is also possible to reduce or avoid cable jacket damage such as might occur if the cable drive assembly is slipping on the cable and moving faster than the cable, as when the cable begins to slow down in the case of an impending stoppage. The cable is further protected by monitoring cable speed in the case of excessively high cable speed, or too low of a cable speed. Runaway cable, such as in the case of excessively high speed, is not desired, nor is too low of a speed, which may be indicative of an instant cable stoppage.

The present invention reduces the risk of cable damage, such as can occur if excessive normal forces, excessive cable slippage, and excessively high or too low speeds of the cable are not properly monitored or avoided. Through automatic monitoring and control, advantageous apparatus and methods result, thereby allowing improved success rates for cable installation. Also, through automatic monitoring and control, less experienced installers can more consistently install the cable.

Turning now to FIGS. 1–6, a schematic representation (FIG. 1), and an example embodiment (FIGS. 2–6) for a cable conveying apparatus 20 in accordance with the invention are shown. FIGS. 7–24 show components of apparatus 20 in greater detail. Apparatus 20 generates motive force(s) for the installation of cable 22 to be pulled from reel 24, or other cable source, and inserted into an interior of duct 26. Duct 26 can be any of a variety of known ducts, such as polyethylene, suitable for receiving cable 22 on a long term basis during use of cable 22 for transmission or conduction of signals. Cable 22 can be any of a variety of known transmission or conductive cable, including fiber optic cable having one or more optical fibers contained therein, and preferably having a circular outer perimeter. Apparatus 20 accepts cable 22 at inlet 36, and cable 22 exits apparatus 20 at outlet 38. Duct 26 extends from apparatus 20 to distal end 30 which can be several hundred feet or less away from apparatus 20, or several thousand feet or more away from apparatus 20.

Preferably, the motive force generated by apparatus 20 includes a pushing force generated by frictional engagement of the cable with a moving drive assembly. Apparatus 20 includes a cable drive assembly 40 which frictionally engages cable 22 so as to provide a motive pushing force. In the preferred embodiment, cable drive assembly 40 is hydraulically driven by a hydraulic pressure source 42 linked by lines 42a to drive assembly 40.

Preferably, the motive force further includes a pulling force generated by air pressure. Apparatus 20 preferably also includes a cable blower assembly 44 which allows for air pressure to enter duct 26. A missile 34 attached to cable 22 at lead end 32 slideably and sealably closes off duct 26 from the atmosphere sufficient to create a pressure difference adjacent to missile 34. Cable blower assembly 44 is linked to a blower or air compressor 46 which generates appropriate air pressure. Air line 46a and valve 46b (FIG. 2) link blower 46 with cable blower assembly 44. Air pressure within duct 26 between missile 34 and apparatus 20 causes missile 34 to move toward exit end 30 of duct 26. The air pressure within duct 26 behind missile 34 generates a motive pulling force at lead end 32 of cable 22.

Apparatus 20 preferably further includes a cable counter assembly 48 which monitors the speed of cable 22 during operation. Preferably, cable counter assembly 48 also monitors the length of cable passing through apparatus 20 from reel 24.

Apparatus 20 preferably also includes a frame 50, which can be supported by legs for supporting frame 50 at a convenient level above the ground. Such supporting structure could also include wheels, for conveniently moving apparatus 20 between locations. Frame 50 also supports cable drive assembly 40, cable blower assembly 44, and cable counter assembly 48. Frame 50 also supports a control assembly 52 (FIG. 2) which monitors and/or controls operation of various of the components of apparatus 20. Frame 50 allows for the various assemblies to be conveniently used and transported together as a unit.

Cable blower assembly 44 includes an air block assembly 54 which links both cable 22 received from cable drive assembly 40, and the source of pressurized air from blower 46 with duct 26. Duct mount assembly 56 forms a portion of cable blower assembly 44, and securably mounts duct 26 to apparatus 20. Adjustment assembly 58 below cable blower assembly 44 also forms a portion of cable blower assembly 44, and allows for vertical adjustment of air block assembly 54 and duct mount assembly 56 relative to frame 50. The adjustment is with respect to cable drive assembly 40. Such vertical adjustment allows for different diameter cables to be installed with apparatus 20. As the diameter of the cable is varied, the location of the central axis of the cable will vary as it exits cable drive assembly 40. Such variance in height is adjusted for in order to allow for proper sealing in airblock assembly 54, as will be described in greater detail below.

Cable drive assembly 40 includes lower and upper tractor drive assemblies 60, 62. Preferably, each is driven by a hydraulic motor, 64, 66. Each tractor drive assembly 60, 62 includes a moveable member. In a preferred embodiment, an endless chain in each assembly 60, 62 is driven by hydraulic motors 64, 66, respectively, so as to frictionally engage cable 22 and apply the motive pushing force to cable 22. In the preferred embodiment illustrated, tractor drive assemblies 60, 62 oppose each other and are aligned in the vertical direction. Other moveable drive members besides opposed endless chains are possible including wheels and/or belts. Further, the moveable members can be arranged in V-shape, as shown in U.S. Pat. No. 4,285,454, for example.

A lower drive counter 68 monitors movement of lower tractor drive assembly 60, which is indicative of the speed of cable drive assembly 40. Such speed monitoring is important for preventing excessive relative speed between cable drive assembly 40 and cable 22 during slippage.

Cable drive assembly 40 further includes a hold down system, such as a hydraulic clamp cylinder 70 in the preferred embodiment, linked to pressure source 42 by line 42a. This generates a predetermined normal force on cable 22 between lower and upper tractor drive assemblies 60, 62. Some slip is acceptable. Too much slip can cause cable jacket damage. Too much slip may also limit the usefulness of apparatus 20 if insignificant push forces are generated. Duct 26 usually contains some irregularities, joints and bends that can keep cable 22 and missile 34 from moving smoothly. Unless an appropriate normal force is generated (not too much slip), the pushing force may be inadequate to overcome the irregularities, and slip may occur too often, causing unnecessary cable jacket damage or insignificant cable push. On the other hand, a normal force which is too high risks crush damage to the cable, and inadequate slippage, such that column damage will be more likely to occur as cable drive assembly 40 continues to move cable 22 when cable 22 is being slowed or stopped within duct 26. When slip does occur under high normal force loads, cable jacket damage may result. By providing for a predetermined normal force with apparatus 20, predetermined slip levels can be monitored. This results in an appropriate level of slip, so as to not cause too many shutdowns of apparatus 20 when cable damage is not significantly at risk, but excessive slip is noted, and results in shut off of apparatus 20 to prevent damage situations.

Apparatus 20 balances the benefits and risks associated with drive assembly 40 which generates a pushing force from a moving member frictionally engaged with the cable. Apparatus 20 reduces or avoids cable damage (crush, column, and slippage), but allows for sufficiently long runs of continuous cable to be installed. Such balance comes from monitoring and controlling the normal force applied to cable 22, the speed of cable 22, and the speed of cable drive assembly 40.

As will be described in greater detail below, the control system of apparatus 20 includes control subsystems for: monitoring and controlling the speed of lower and upper tractor drive assemblies 60, 62; monitoring the speed of cable 22; monitoring and controlling system air pressure; and monitoring and controlling the hold down system, such as clamp cylinder 70.

Figure 7:
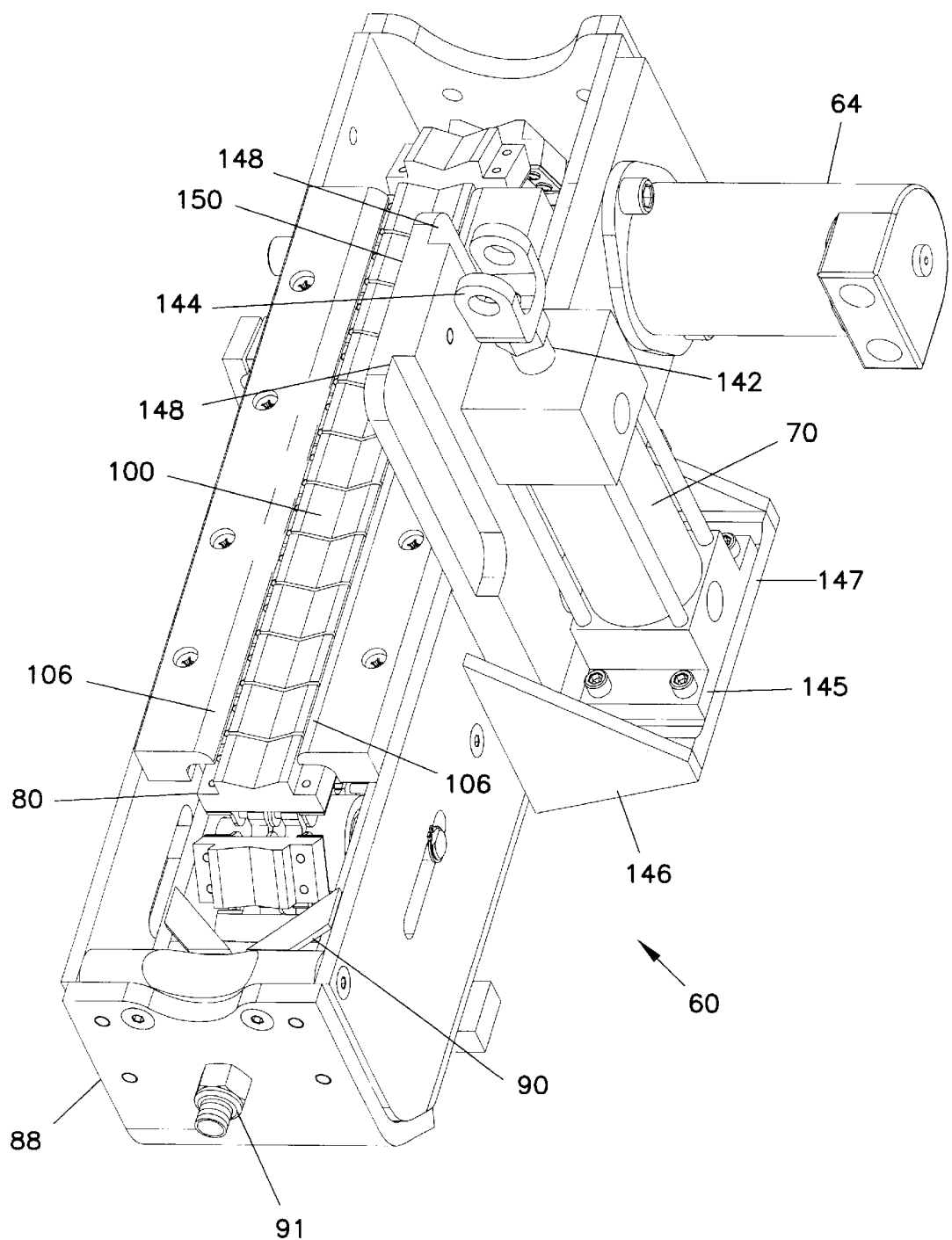
FIG. 7 is a perspective view of the lower tractor drive assembly of the apparatus shown in FIG. 2.
Figure 8:
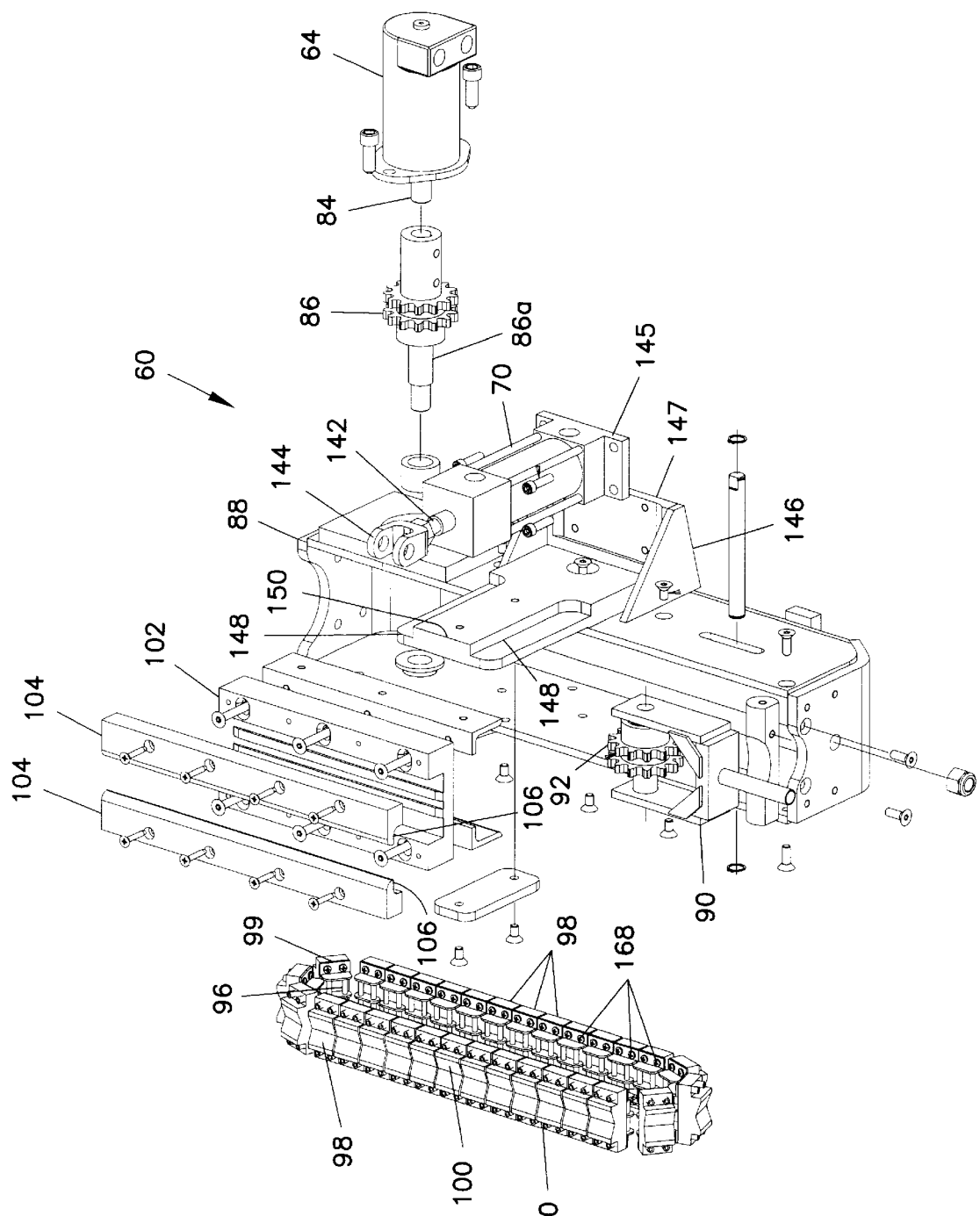
FIG. 8 is an exploded perspective view of the lower tractor drive assembly.

Referring now to FIGS. 7–11, further details of cable drive assembly 40 are shown. FIGS. 7 and 8 illustrate lower tractor drive assembly 60 in greater detail. Lower tractor drive assembly 60 includes an endless drive chain 80 driven by hydraulic motor 64 having an output shaft 84 connected to drive sprockets 86. Motor 64 is mounted to housing 88 at one end. At an opposite end of housing 88, a tensioner 90 is moveably mounted via threaded rod and nut 91 to adjust tension on drive chain 80, and includes rotatably mounted sprockets 92 for supporting drive chain 80. Chain 80 includes a plurality of metal chain links 96 with outwardly facing pads 98 mounted to mounting flanges 99 of chain 80. Mounting flanges 99 extend outwardly from links 96 on each side of chain 80.

Chain 80 is mounted for movement relative to housing 88 by rotation of drive sprockets 86 by motor 64. Elongated region 100 of chain 80 is supported by a center chain guide plate 102 mounted to housing 88. Guides 104 are mounted to center chain guide plate 102 on opposite sides of chain 80. Guides 104 each include a lip 106 which covers a side portion of each pad 98 when positioned in the elongated section 100 during operation. Preferably, guide plate 102 and guides 104 are made from a material with good slide and wear properties, such as plastic. Nylatron plastic is one example.

Referring back to FIG. 4, a counter sprocket 108 is mounted to an end of sprocket shaft 86a connected to motor 64. Sprocket 108 is sensed by a sensor assembly 112 such as a magnetic pickup which senses sprocket teeth and generates a corresponding signal indicative of moving teeth. Housing 114 (see FIG. 2) protects sprocket 108 and sensor assembly 112. The signal is input to the control system for monitoring movement (speed) of output shaft 84. Monitoring the speed of output shaft 84 enables monitoring of the speed of chain 80 directly driven by output shaft 84. Sensor assembly 112 includes a permanent magnet, a pole-piece, and a sensing coil all contained in a protective case. The teeth of sprocket 108 (iron, steel or other magnetic material) distort the magnetic flux field passing through the sensing coil and pole-piece, which in turn generates a wave form signal processed by the control system. Other proximity sensors, and other speed sensors can be used with apparatus 20, as desired.

Figure 9:
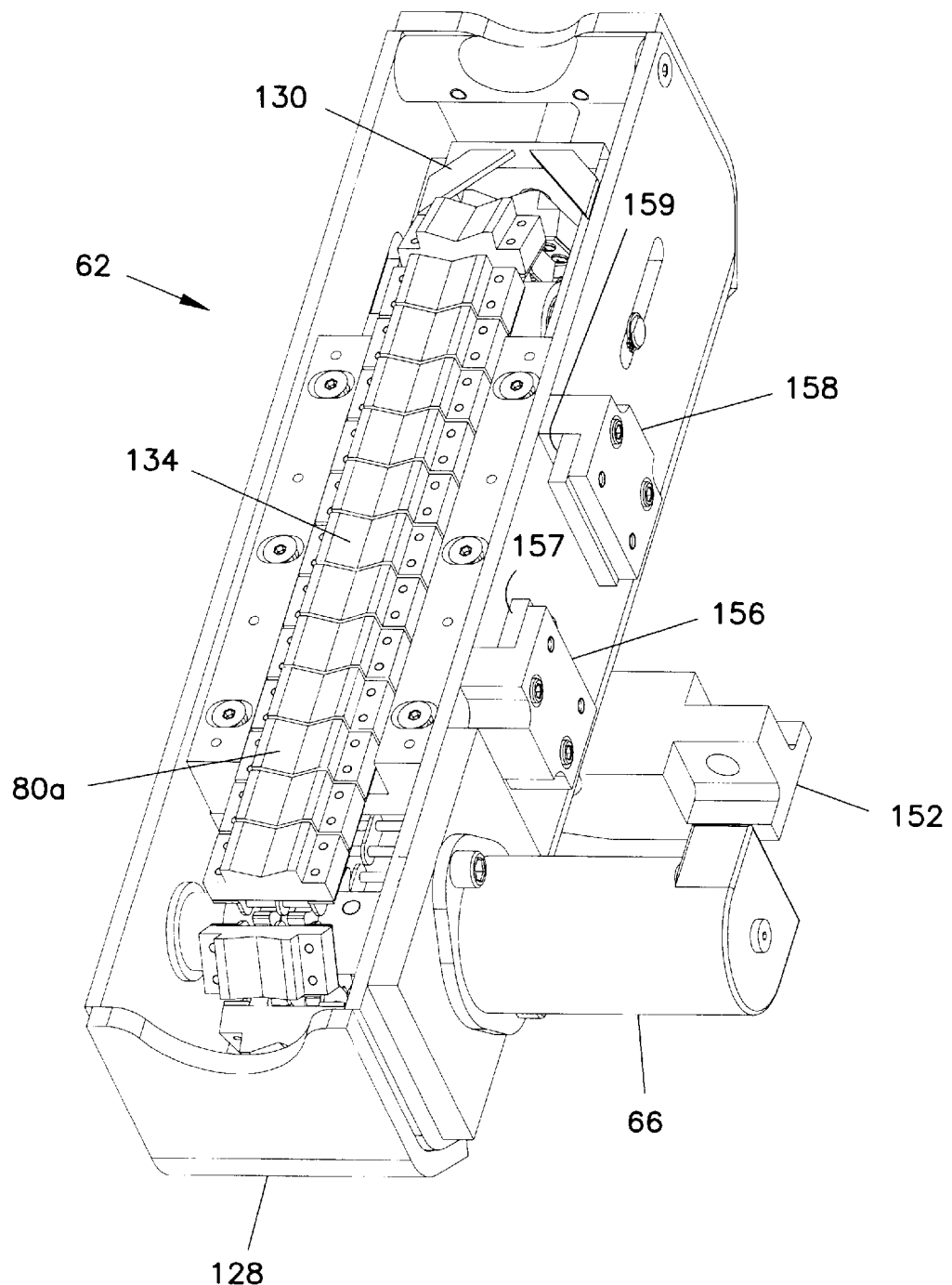
FIG. 9 is a perspective view of the upper tractor drive assembly of the apparatus shown in FIG. 2.
Figure 10:
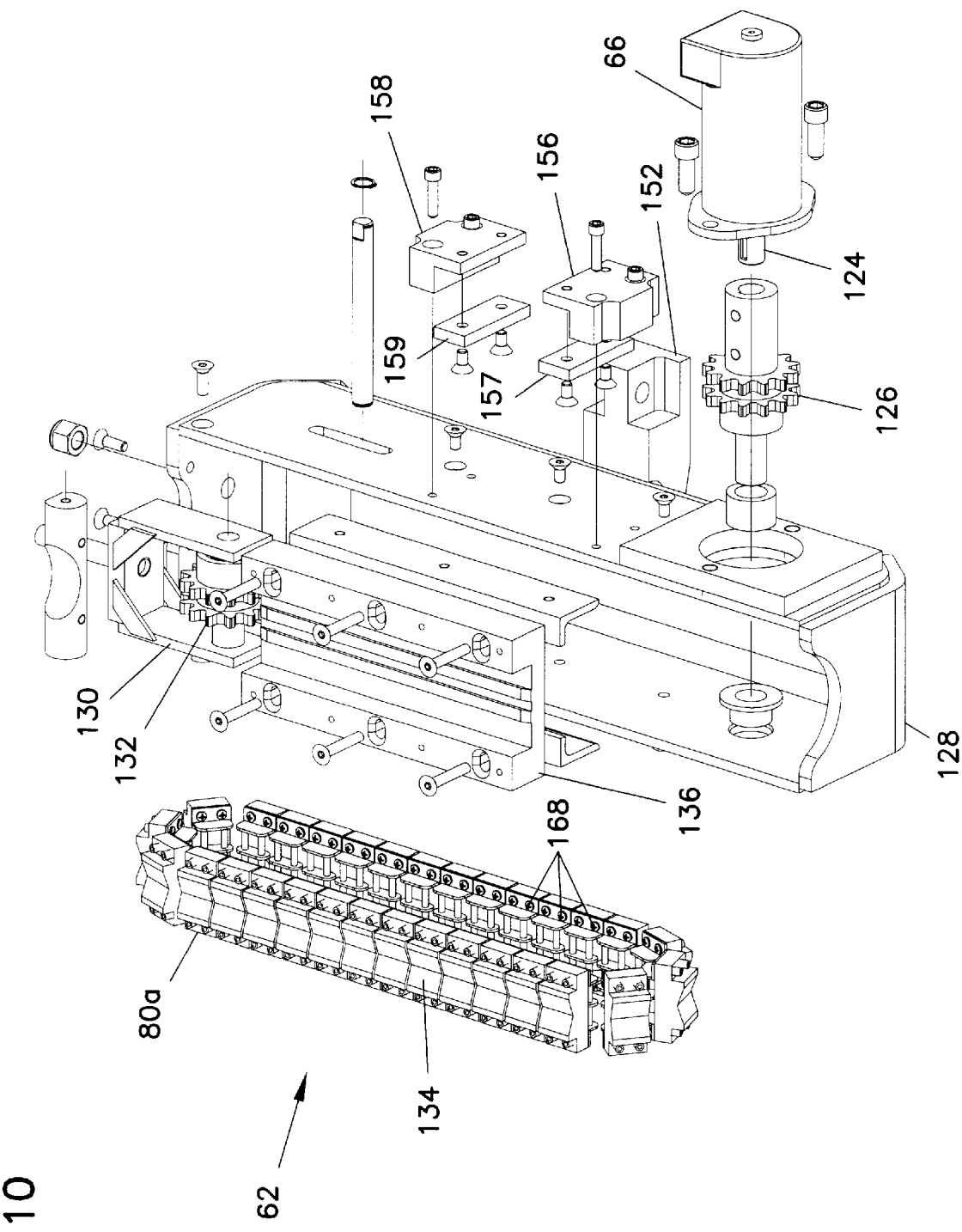
FIG. 10 is an exploded view of the upper tractor drive assembly.

Referring now to FIGS. 9 and 10, upper tractor drive assembly 62 includes a drive chain 80a, constructed in a similar manner as drive chain 80 of lower tractor drive assembly 60. Hydraulic motor 66 drives an output shaft 124 which turns drives sprockets 126. Sprockets 126 directly engage drive chain 80a so as to move drive chain 80a in a similar manner as drive chain 80. A housing 128 surrounds chain 80a, and supports various components including motor 66, and output shaft 124 at one end of the housing. An adjustable tensioner 130 at an opposite end of housing 128 supports rotatable sprockets 132 also supporting drive chain 80a. Chain 80a includes an elongated region 134 supported by a center chain guide plate 136 mounted to housing 128, and facing in an opposite direction to elongated region 100 of drive chain 80 of lower tractor drive assembly 60. Guide plate 136 is constructed from similar materials as guide plate 102. Elongated regions 100, 134 apply a normal force to cable 22 and the motive pushing force.

Referring now to FIGS. 2–10, the connection is shown between lower and upper tractor drive assemblies 60, 62. The connection includes hydraulic clamp cylinder 70 mounted to housing 88 of lower tractor drive assembly 60 at one end and to housing 128 of upper tractor drive assembly 62 at an opposite end. Cylinder 70 includes an extending shaft 142 and a clevis 144 at a distal end. A cylinder mounting bracket 146 mounts cylinder 70 to housing 88. Cylinder flange 145 of cylinder 70 mounts to bracket 146 at a bracket mounting flange 147 at a lower end. Bracket 146 further includes spaced apart channels 148 and a center projection 150 at an upper end.

Structures associated with upper tractor drive assembly 62 cooperate with clevis 144, and channels 148 and center projection 150, respectively, to mount upper tractor drive assembly 62 for movement. Specifically, a flange 152 extends from housing 128 for receipt of clevis 144. A pin 154 (FIG. 5) connects clevis 144 to flange 152. Guide blocks 156, 158 extending from housing 128 are spaced apart so as to be received in channels 148, with center projection 150 disposed therebetween. Protective pads 157, 159 extend from guide blocks 156, 158 toward bracket 146.

When cylinder 70 is operated so as to move shaft 142 between positions, the clevis link causes corresponding movement of upper tractor drive assembly 62 relative toward or away from lower tractor drive assembly 60. The cooperating guide blocks 156, 158 and channels 148 and center projection 150 result in alignment of lower and upper tractor drive assemblies 60, 62 at all times.

Clamp cylinder 70 is preferred because of its repeatability and ease of use. Manually adjustable clamp systems are possible in accordance with the invention, but difficulties can arise if the normal force and slippage are not adequately monitored, so as to avoid or reduce the likelihood of crush damage, column damage, and jacket damage.

Figure 11:
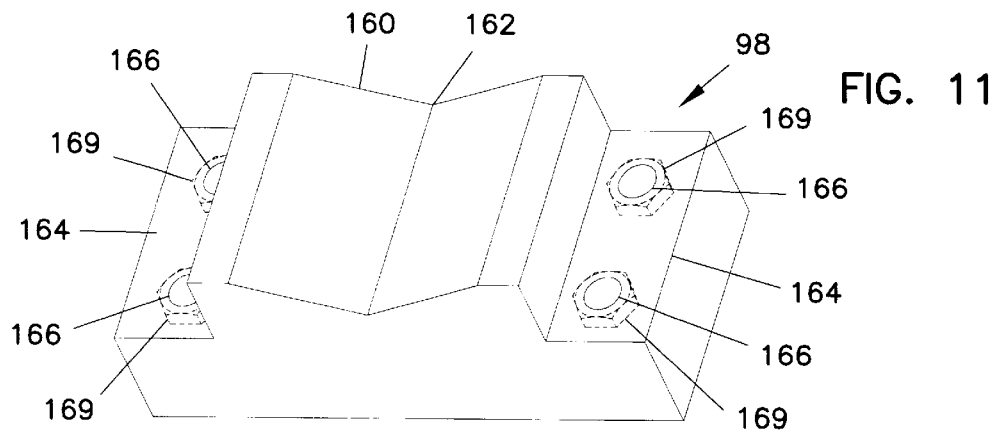
FIG. 11 is an enlarged perspective view of one of the chain pads.

Referring now to FIG. 11, an example chain pad 98 is shown in greater detail. An outer facing surface 160 defines a central V-shaped channel 162. Two oppositely positioned flanges 164 each include two mounting apertures 166 extending therethrough for receipt of fasteners 168 (see FIGS. 8 and 10) for mounting pad 98 to chain links 96. Preferably, pad 90 is made from moldable plastic and includes insert molded lock nuts 169. During use, the V-shaped channel 162 receives cable 22, in a self-centering manner.

Figure 5:
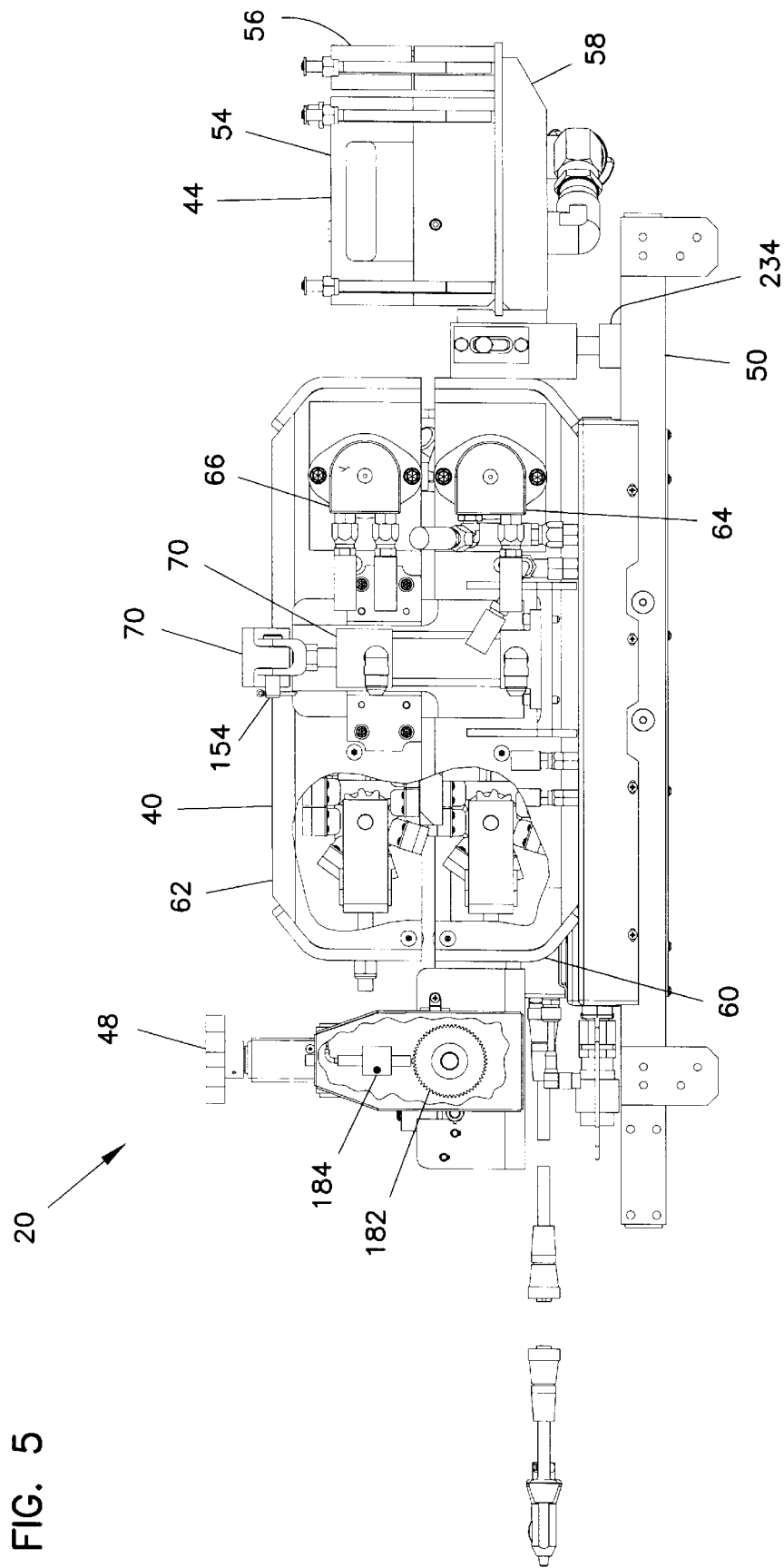
FIG. 5 is a back view of the apparatus shown in FIG. 2, with portions of the housing removed.
Figure 6:
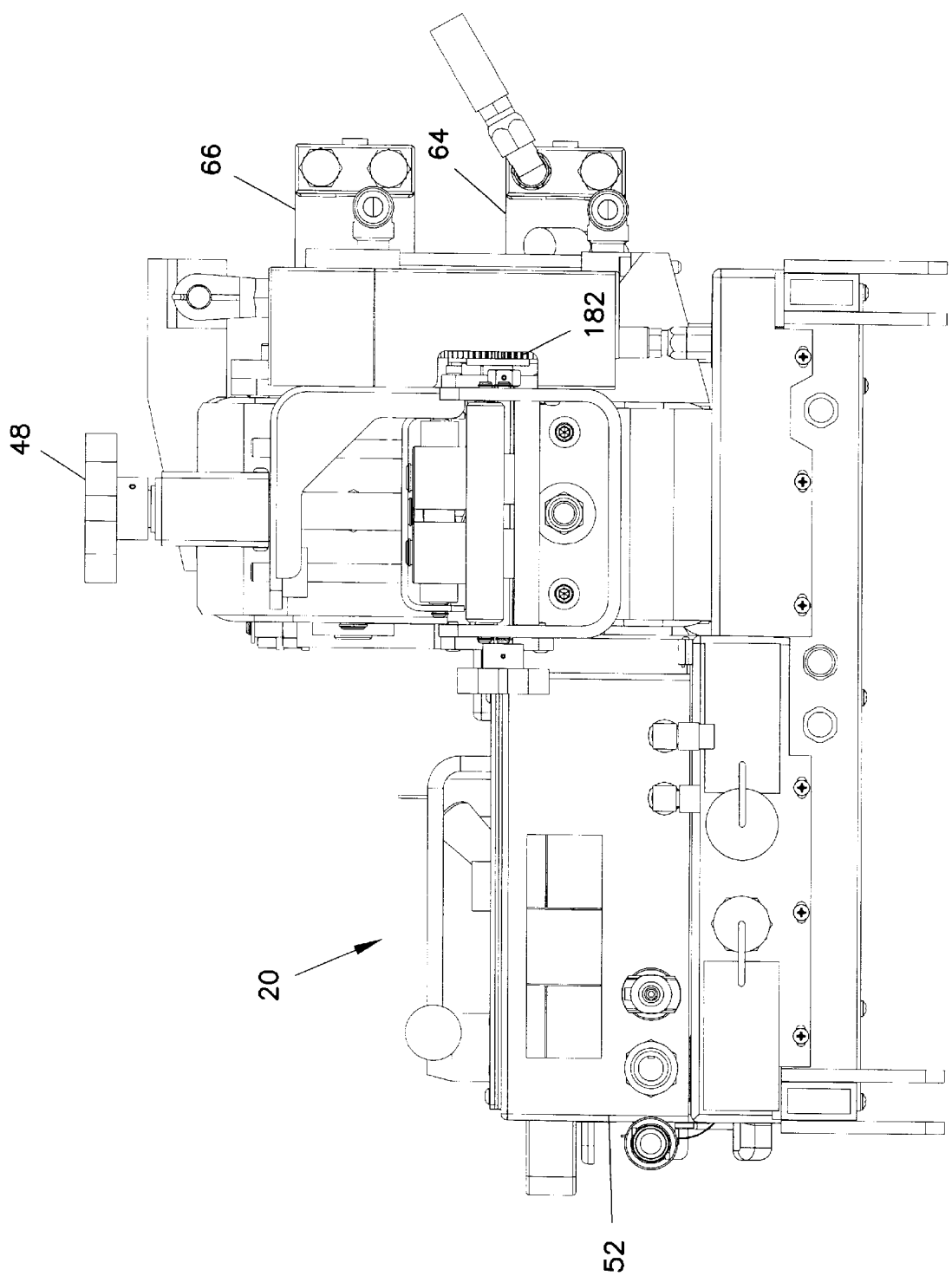
FIG. 6 is an end view of the apparatus shown in FIG. 2.
Figure 12:
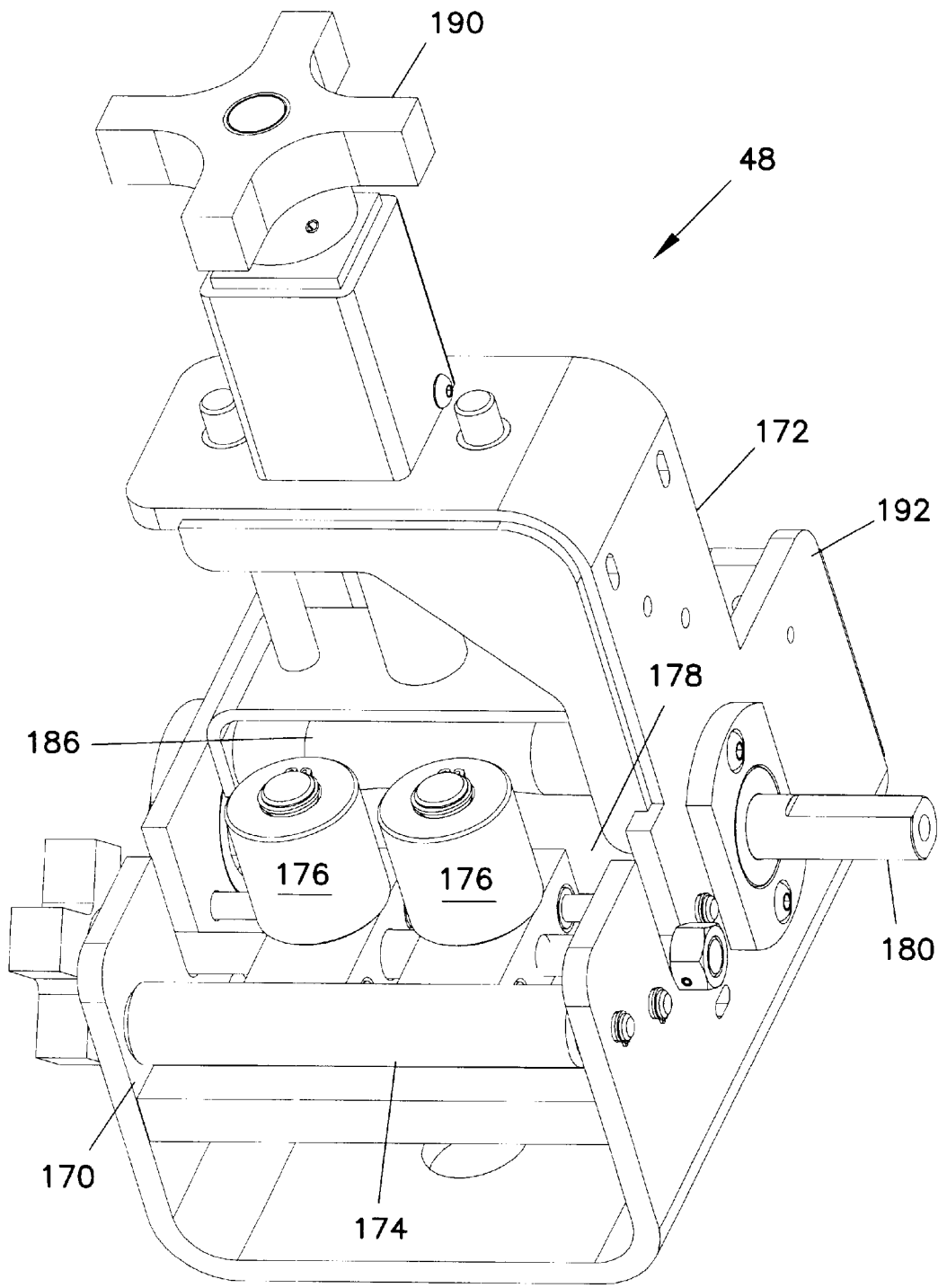
FIG. 12 is a perspective view of the cable counter assembly of the apparatus shown in FIG. 2.
Figure 13:
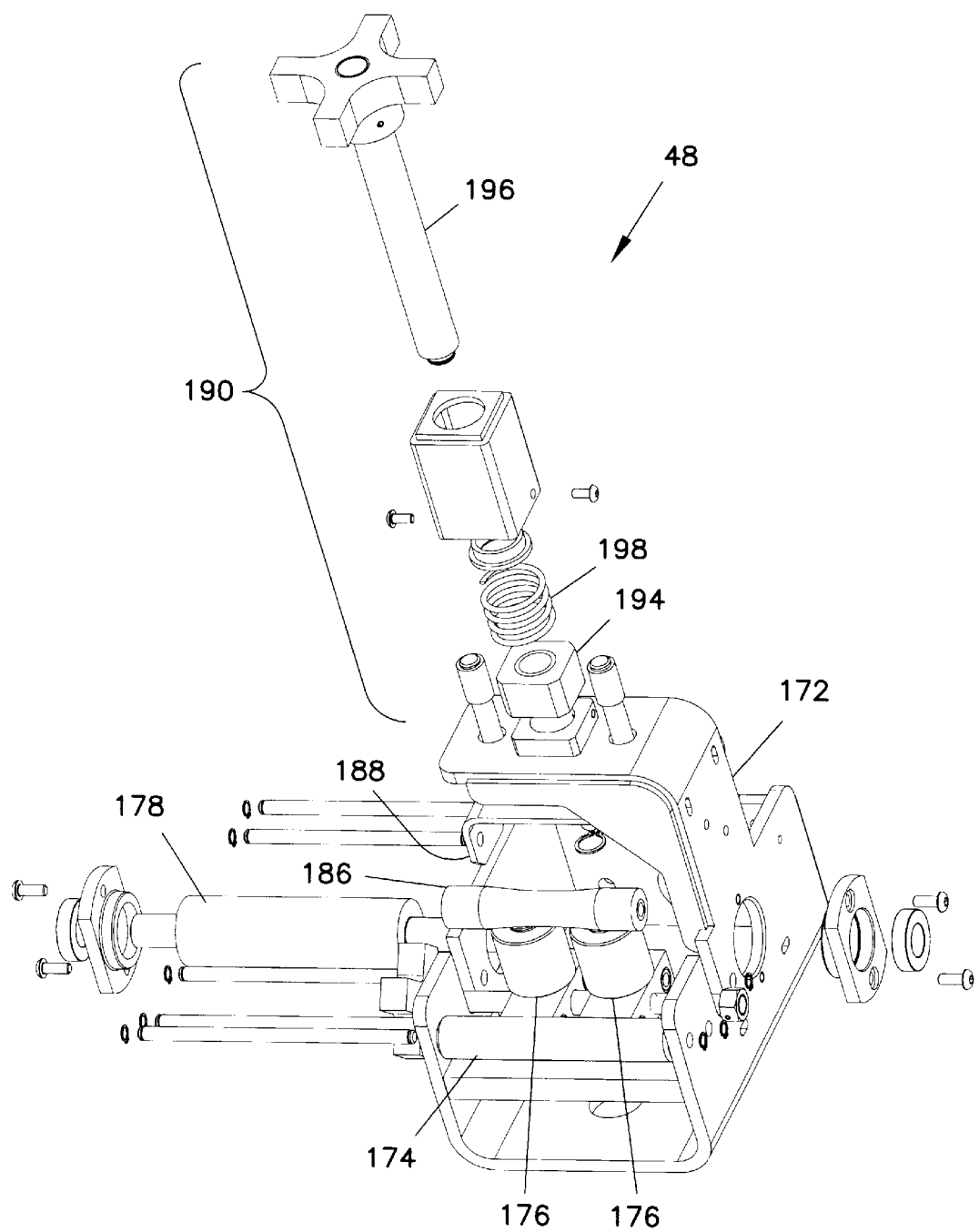
FIG. 13 is an exploded view of the cable counter assembly.
Figure 14:
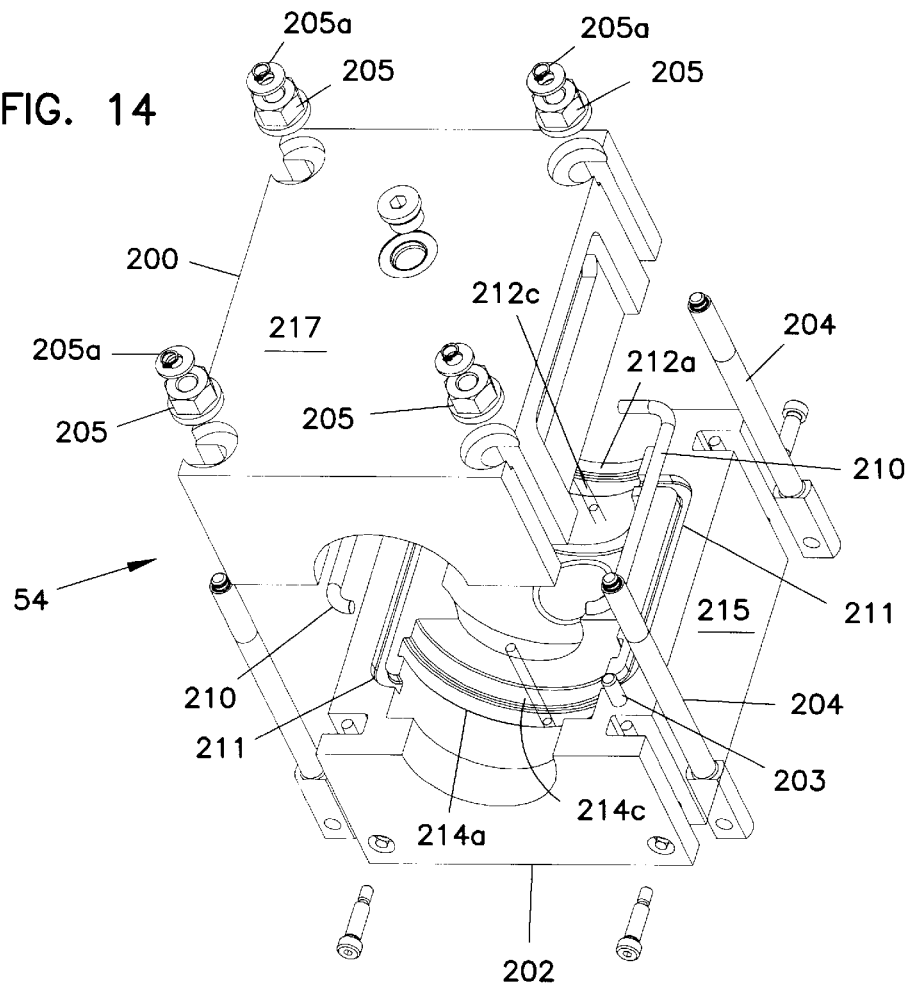
FIG. 14 is an exploded perspective view of portions of the air block assembly of the apparatus shown in FIG. 2.

Referring now to FIGS. 12 and 13, details of cable counter assembly 48 are shown in greater detail. Inlet end 170 receives cable 22 to be counted or monitored during introduction into the conduit from a source of cable, such as reel 24 illustrated in FIG. 1. Cable counter assembly 48 includes a main housing 172 mounted to lower tractor drive assembly 60, a generally horizontal front lower support roller 174, and two vertical centering rollers 176. Output roller 178 is positioned beneath cable 22 during use. Output roller 178 is utilized to generate information about cable speed, and also preferably cable length. Output roller 178 includes an output shaft 180, and a sprocket 182 (FIG. 5). A sensor assembly 184 mounted to housing 172 senses sprocket teeth in order to generate a corresponding signal indicative of moving teeth. Sensor assembly 184 is similarly constructed as sensor assembly 112 for monitoring drive assembly speed. Cable counter assembly 48 relies on frictional engagement with output roller 178 in order to generate appropriate signals from sensor assembly 184. Top pressure rollers 186 apply downward pressure on cable 22 during use so as to achieve proper frictional engagement with output roller 178. Only one pressure roller 186 is visible in the drawings on an upstream side of output roller 178. The second pressure roller is located on the downstream side of roller 178.

Figure 2:
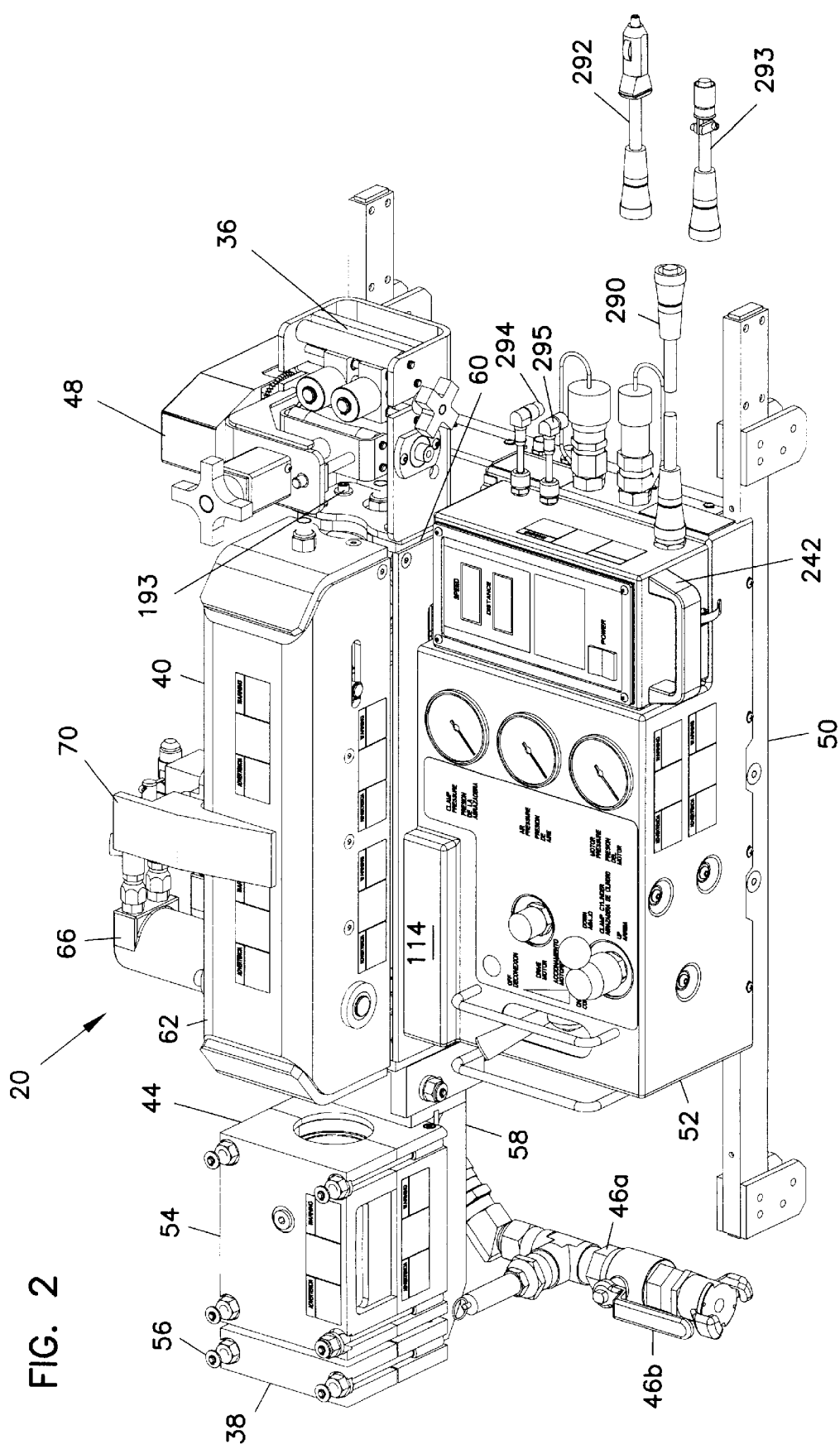
FIG. 2 is a perspective view of an embodiment of the cable conveying apparatus in accordance with the present invention.
Figure 3:
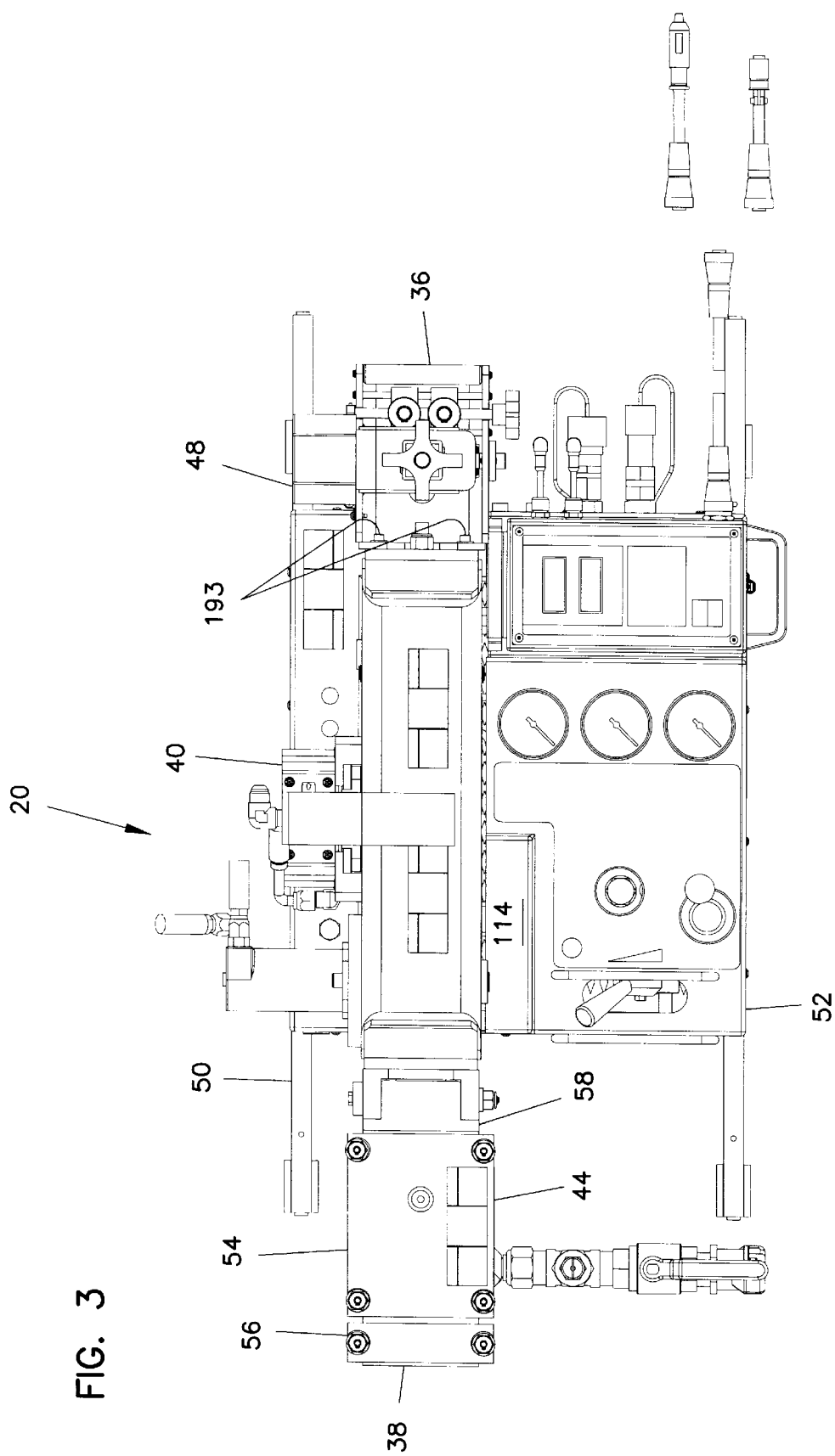
FIG. 3 is a top view of the apparatus shown in FIG. 2.
Figure 4:
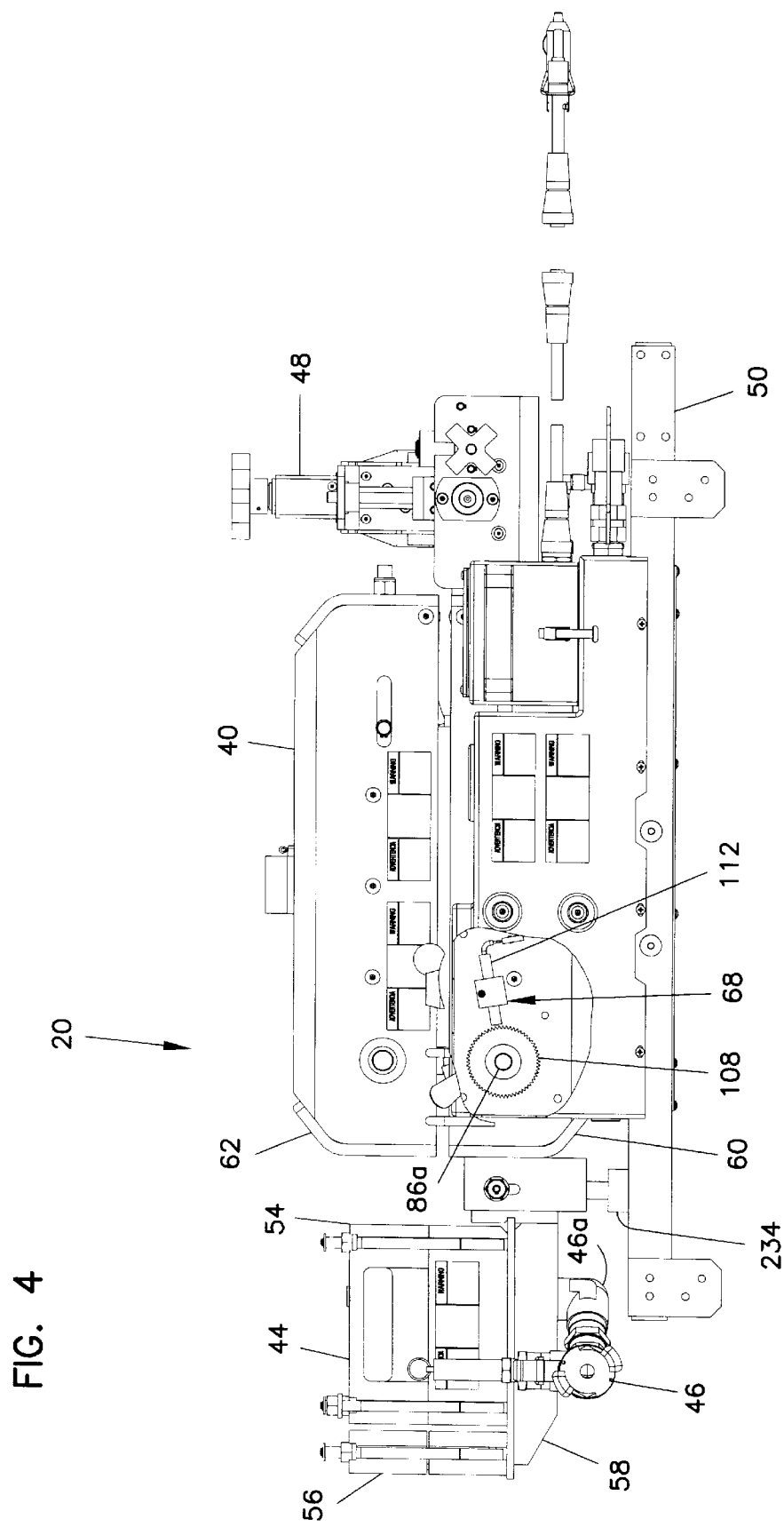
FIG. 4 is a front view of the apparatus shown in FIG. 2, with a portion of the housing removed.

Top pressure rollers 186 are mounted to a movable mounting plate 188 connected to a tensioner 190 for adjustment of pressure of pressure rollers 186 on cable 22. Tensioner 190 is preferably spring loaded, so as to prevent excessive pressure on cable 22 between output roller 178, and pressure rollers 186. A block 194 threadably engages a shaft 196. A spring 198 biases block 194 downwardly. Block 194 moves upwardly against spring 198 when cable 22 has a kink, or when overcranking of shaft 196 occurs by the operator. Pressure rollers 186 are preferably V-shaped so as to help achieve a cable centering feature. Cable 22 exits cable counter assembly 48 at outlet end 192 where cable 22 is engaged by cable drive assembly 40. Outlet end 192 mounts to lower tractor drive 60 with suitable bolts or other fasteners 193 (FIGS. 2 and 3).

Referring now to FIGS. 14–18, further details of cable blower assembly 44 are shown. Air block assembly 54 shown in FIGS. 14, 17 and 18 receives cable 22 from cable drive assembly 40, and air pressure from blower 46 and directs both into duct 26. Air block assembly 54 includes upper and lower blocks 200, 202, two locator pins 203, and four mounting bolts 204. Bolts 204 are hingedly connected to lower block 202 adjacent each corner, and the bolts reside in longitudinal slots through upper block 200, during use. Threaded nuts 205 secure upper block 200 to lower block 202 during use. C-clips 205a prevent nuts 205 from becoming separated from bolts 204. Positioned between upper and lower blocks 200, 202 are inlet seals 206 which slideably and sealably engage cable 22 during use to prevent or restrict air flow out of airblock assembly where cable 22 enters. Outlet seals 208 seal the interior of air block assembly 54 and duct 26 from the atmosphere. A perimeter seal 210 in groove 211 seals a remainder of air block assembly 54 between inlet seals 206 and outlet seals 208 from the atmosphere. An air inlet 216 in lower block 202 connects to blower 46 so as to supply air block assembly 54 with the pressurized air.

Figure 17:
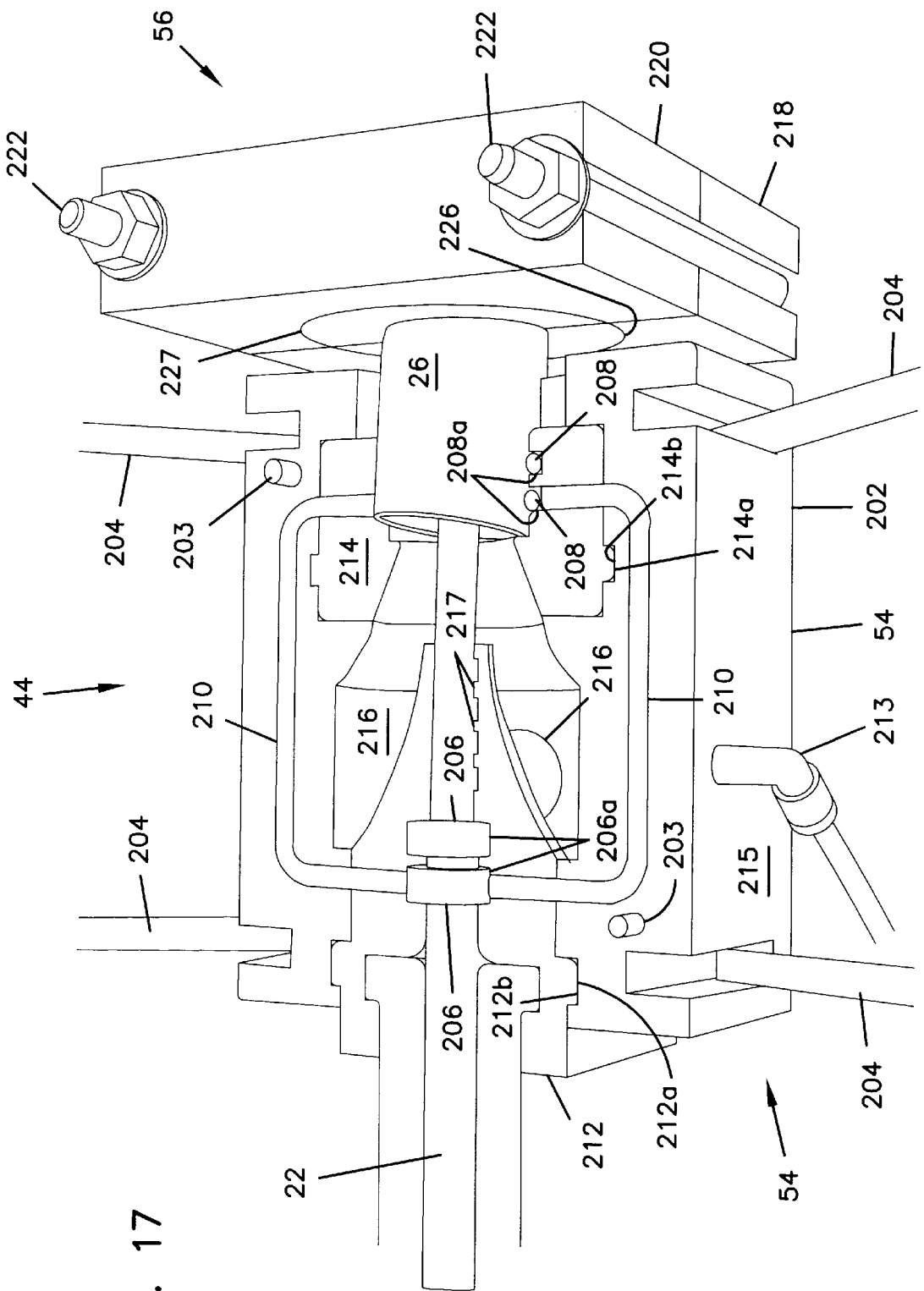
FIG. 17 shows the air block assembly and the duct mount assembly with the cable and the duct in place, and the upper block of the air block assembly removed.
Figure 18:
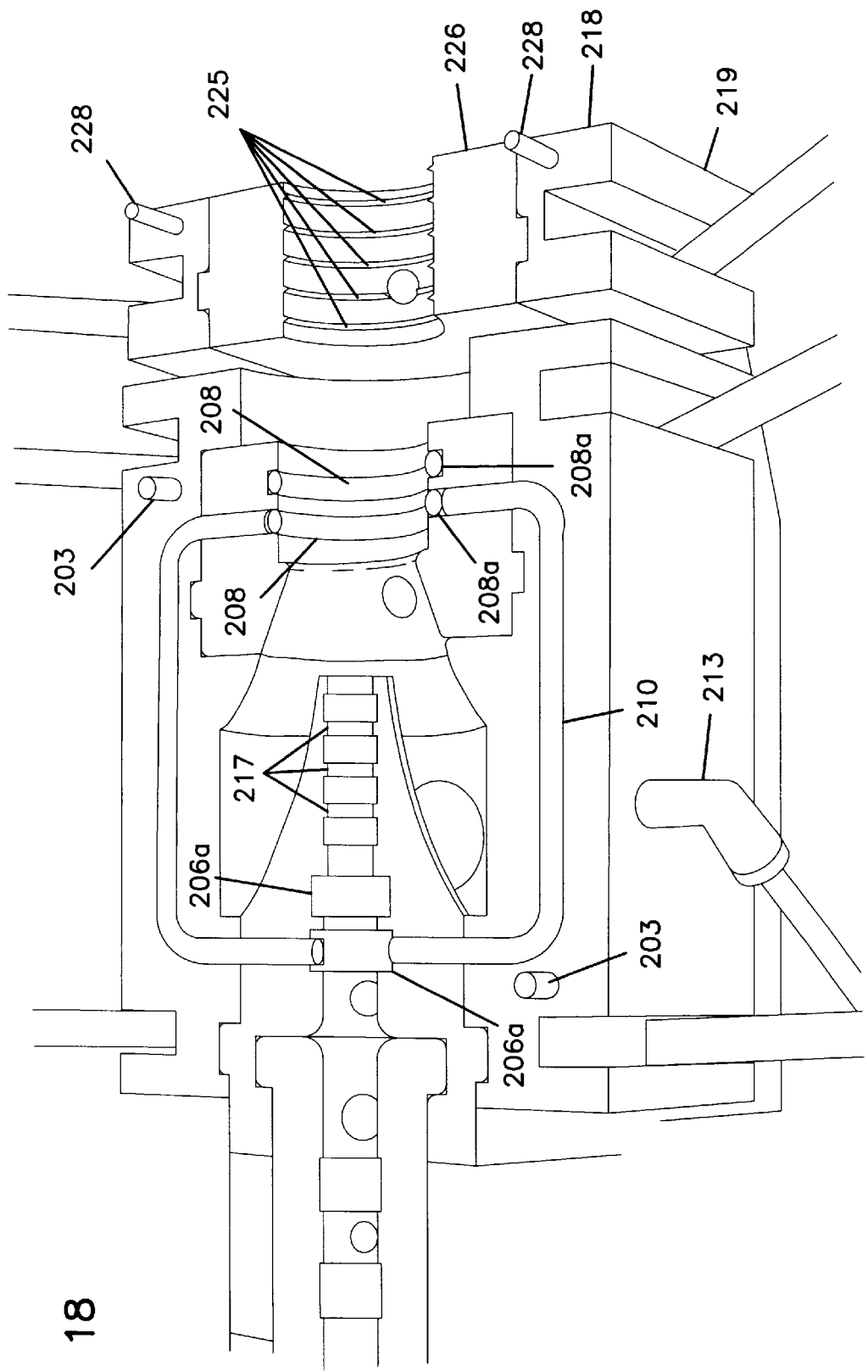
FIG. 18 shows the air block assembly and the duct mount assembly with the upper block portions of each removed, and no duct or cable present.

With particular reference to FIGS. 17 and 18, contained within air block assembly 54 are inlet insert 212 and outlet insert 214 which allow for size adjustment to accommodate different cable sizes, and different duct sizes, respectively. Inserts 212 and 214 are removably mounted to lower main block 215 of lower block 202. Upper block 200 is constructed in a similar manner including an upper main block 217. Inserts 212, 214 are not shown in FIG. 14. Each insert 212 and 214 includes inner grooves 206a, 208a for receipt of seals 206, 208, respectively. Also, lower main block 215 includes grooves 212a, 214a, and inserts 212, 214 include projection rings 212b, 214b along the mounting surfaces for secure engagement. Securing fasteners, pins or screws 212c, 214c further align and secure inserts 212, 214 to lower main block 215. A similar construction is provided for upper main block 217. An outlet or tap line 213 allows for system air pressure to be monitored and is connected to control assembly 52. A kit of differently-sized and selectable inserts 212, 214 can be provided so as to allow apparatus 20 to be used with different sizes of cable and duct.

Within air block assembly 54, a venturi effect is provided by the internal configuration of internal chamber 216. Pressure rings 217 are provided to further seal moving cable 22 from the atmosphere, in combination with seals 206. Rings 217 are believed to develop alternatively high and low pressure regions adjacent cable 22, and this assists to develop a good seal between air block assembly 54 and the atmosphere.

Figure 15:
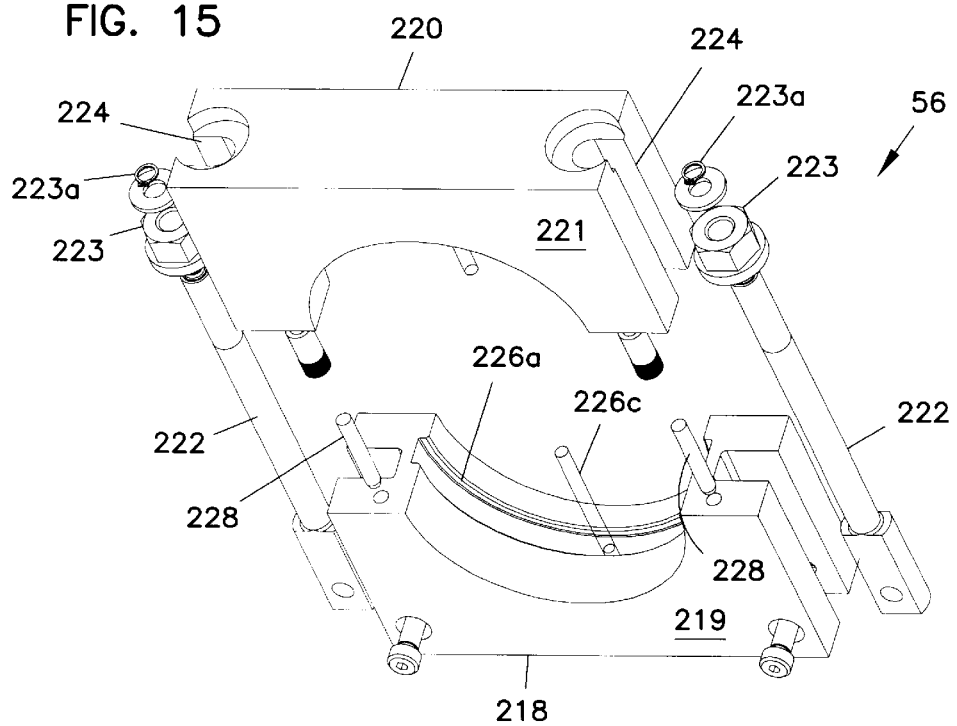
FIG. 15 is an exploded perspective view of portions of the duct mount assembly of the apparatus shown in FIG. 2.

Referring now to FIGS. 15, 17, and 18, duct mount assembly 56 is shown in greater detail. Duct mount assembly 56 includes lower and upper blocks 218, 220 held together by two bolts 222 which are hingedly connected to lower block 218. Bolts 222 also reside in slots 224 in upper block 220. Threaded nuts 223 secure upper block 218 to lower block 220. C-clips 223a prevent nuts 223 from becoming separated from bolts 222. Each block 218, 220 has at least one gripping ring 225 (FIG. 18) for gripping an exterior surface of duct 26 to secure duct 26 to duct mounting assembly 56. Each block 218, 220 has five rings 225 in the preferred embodiment illustrated. Locator pins 228 assist with proper alignment of blocks 218, 220.

To allow for different duct sizes to be used with apparatus 20, gripping ring inserts 226, 227 are removably secured to lower and upper main blocks 219, 221 of lower and upper blocks 218, 220. Insert 226 has gripping rings 225 positioned on an inside surface, and a projection ring on an outside surface. Projection ring 226b resides in a groove 226a on lower main block 219 for secure mounting together. A securing fastener, pin or screw 226c further aligns and secures insert 226 to lower main block 219. A similar construction is provided for upper main block 221 and insert 227. Inserts 226, 227 are not shown in FIG. 15. A similar sizing kit can be provided for inserts 226, 227.

Figure 16:
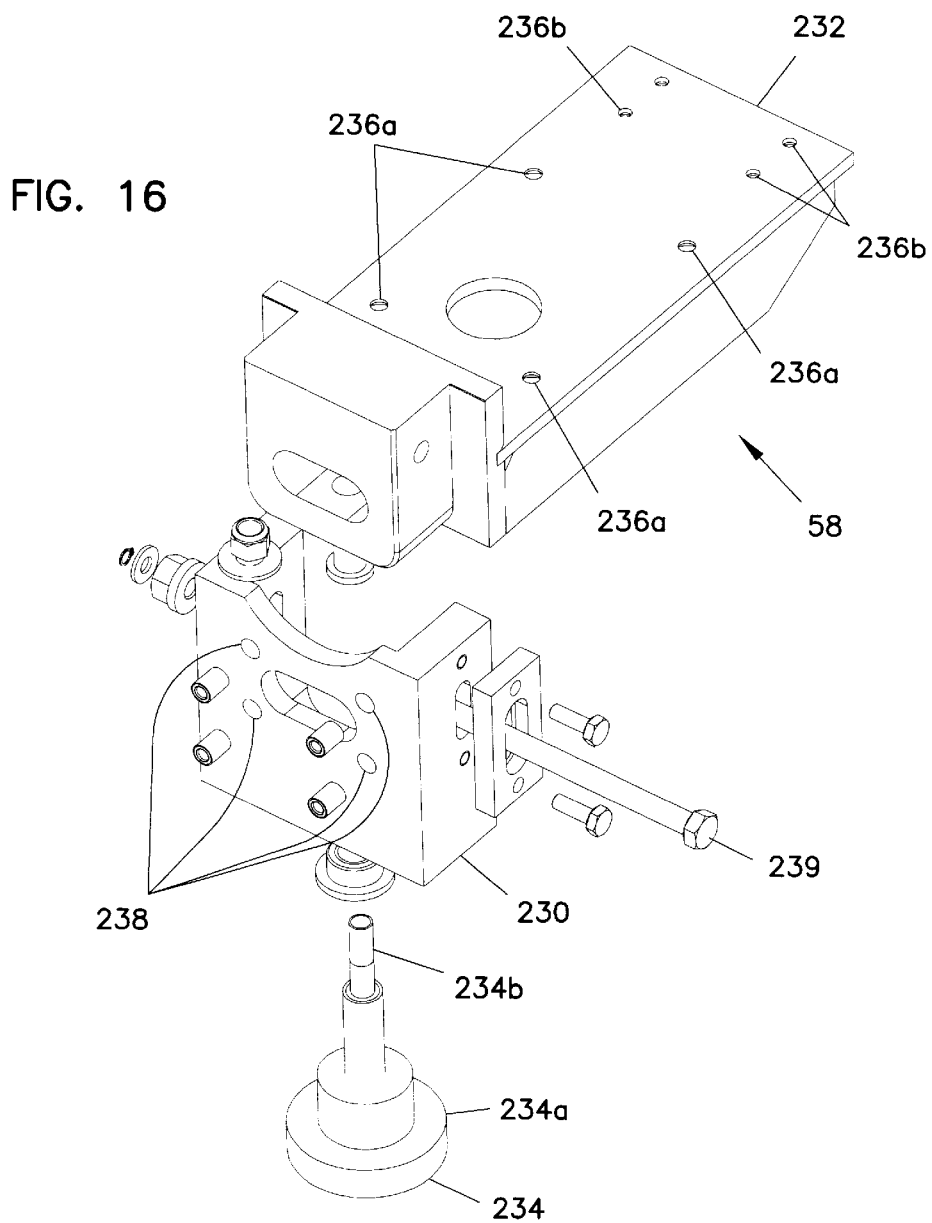
FIG. 16 is an exploded perspective view of the adjustment assembly for the air block assembly and the duct mount assembly of FIGS. 14 and 15.

Referring now to FIG. 16, adjustment assembly 58 is shown in greater detail. A main mounting block 230 mounts to lower tractor drive 60 (FIGS. 2–5). An upper mounting plate 232 is vertically movable relative to main mounting block 230. Adjustment mechanism 234 allows vertical adjustment of upper mounting plate 232 relative to main mounting block 230. Upper mounting plate 232 supports air block assembly 54 and duct mount assembly 56. Such vertical adjustment allows for use of air block assembly 54 and duct mount assembly 56 with cables of various dimensions wherein the center line would vary relative to lower tractor drive assembly 60. Each of airblock assembly 54 and duct mount assembly 56 mount to mounting plate 232 through apertures 236a, b with suitable screws or other fasteners. Similarly, main mounting block 230 mounts to lower tractor drive assembly 60 with suitable bolts or other fasteners received in apertures 238. Knob 234a is rotatable to move upper mounting plate 232 up or down along threaded shaft 234b relative to main mounting block 230. Clamp 239 locks upper mounting plate 232 into position once its height is adjusted.

Figure 19:
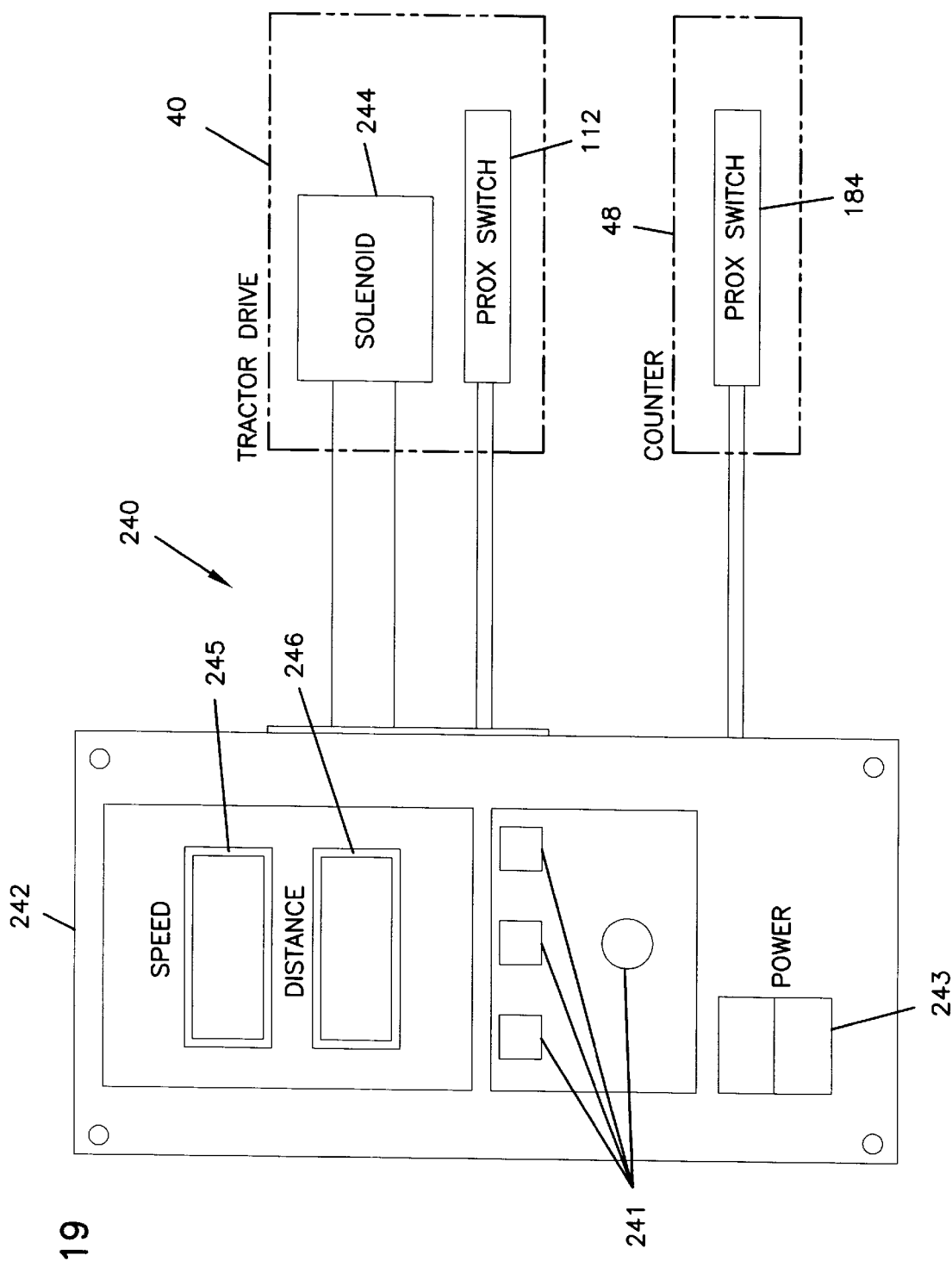
FIG. 19 is a schematic representation of the cable speed control system of the apparatus shown in FIG. 2.

Referring now to FIG. 19, a cable speed control system 240 of control assembly 52 is shown schematically. Control system 240 controls operation of cable drive assembly 40 so as to terminate operation in the case of an excessive relative speed difference between cable drive assembly 40 and cable 22. Inputs to a cable speed control module 242 include electronic signals from cable sensor assembly 184, and tractor drive sensor assembly 112. Cable speed control system 240 includes circuitry for comparing the sensor inputs so that if a predetermined speed difference exists, such as a 15% faster tractor drive speed over the cable speed, a tractor drive shut off signal is generated. A smaller percentage difference in the threshold is possible, but it may result in more frequent, and less necessary system shut offs. A greater percentage difference is possible, but it may result in less system shut offs, but more cable jacket damage.

Should control module 242 sense an excessive speed of tractor drive relative to cable 22, control module 242 will activate a hydraulic motor control switch, such as a solenoid 244, thereby shutting down hydraulic motors 64, 66 and cable drive assembly 40. Should cable speed exceed a maximum threshold or fall below a minimum threshold, the same shut off signal is generated by control module 242 for solenoid 244. Not only is cable speed monitored, but so is cable distance. Control module 242 has both a cable speed display 245, and a cable distance display 246. Control module 242 also includes system electrical power switch 243, and various buttons 241 for resetting control system counters and displays, such as displays 245, 246 noted above, for example.

Control module 242 is preferably software controlled and is programmable to accept proximity switch or other monitoring sensor signals indicative of cable movement and tractor drive movement. Control module 242 is programmed accordingly to generate the appropriate display signals, i.e. speed and distance of cable 22, and the appropriate solenoid activation signal (tractor drive shut off signal) based on the signals received from the sensors. Any of a variety of conventional control modules 242 with programming capability can be used. Control module 242 is preferably appropriately programmed with desired delays between receipt of signals from the sensors and when a shut off signal is generated so that only desired shut offs occur. For example, cable 22 may jerk from time to time as it is pulled from reel 24. Such jerking motion may result in slippage signals from the cable slip sensors. However, with an appropriate time delay programmed into module 242, no system shut off will occur since this slippage is acceptable. Slippage from jerk is usually only a short term slippage, and typically does not result in cable damage. Therefore, there is no need to cause system shut off in these conditions.

FIG. 2 illustrates an electrical power cord 290 for control module 242, as well as two selectable adaptor plug cords 292, 293 for use with different power supplies in the field. FIG. 2 also illustrates detachable sensor lines 294, 295 for permitting detachment of control module 242 from the rest of apparatus 20.

Figure 20:
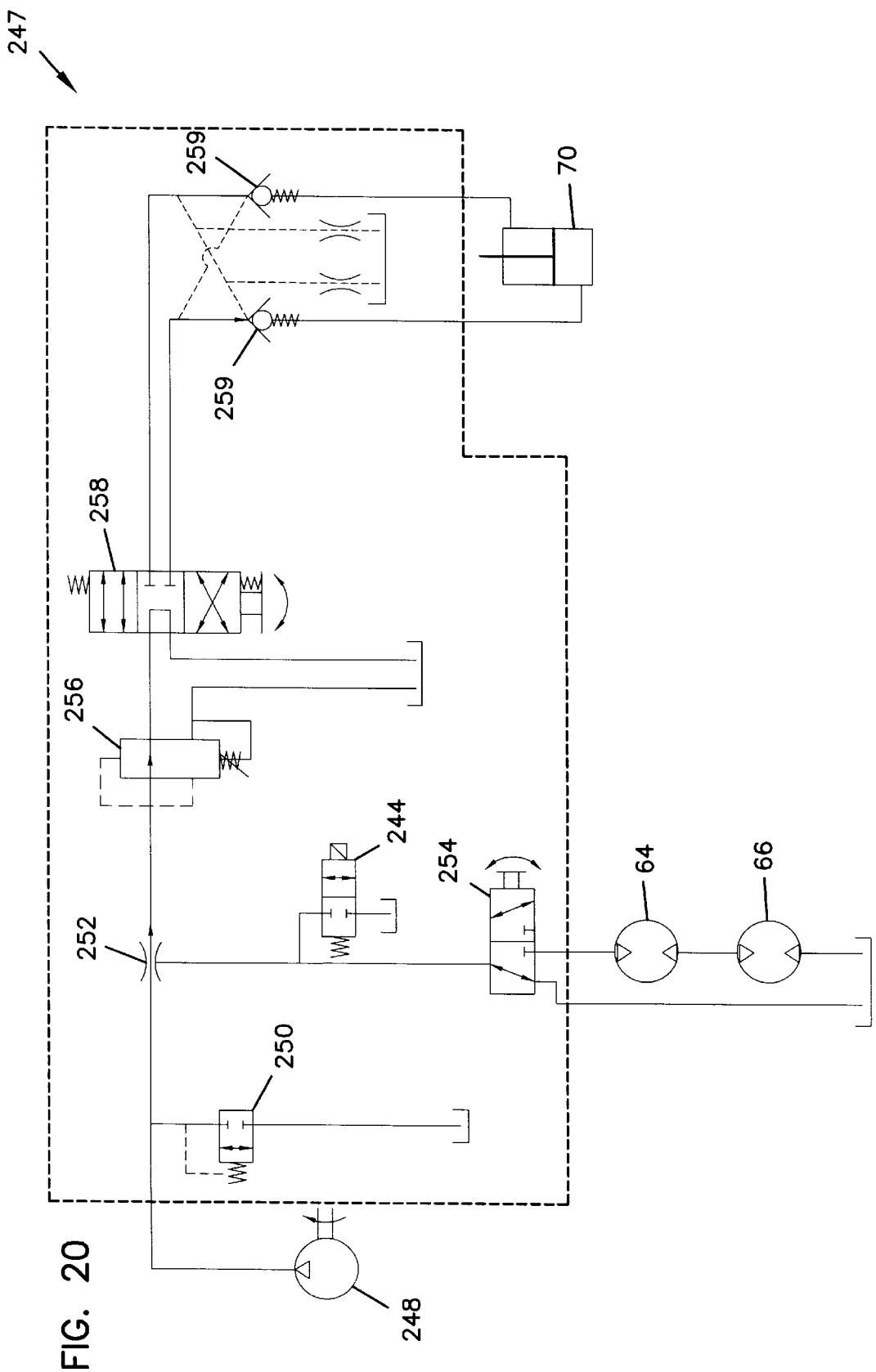
FIG. 20 is a schematic representation of the hydraulic control system of the apparatus shown in FIG. 2.

Referring now to FIG. 20, a schematic is shown for a hydraulic control system 247 of control assembly 52. Specifically, hydraulic control system 247 includes a hydraulic pump 248 (source 42 in FIG. 1) linked to a fixed relief valve 250, and a pressure-compensated regulator 252. Solenoid 244, and a first directional control valve 254 lead to hydraulic motors 64, 66. A pressure reducer 256, a second directional control valve (four position, three-way) 258, and two pilot-to-open check valves 259 lead to clamp cylinder 70.

Figure 21:
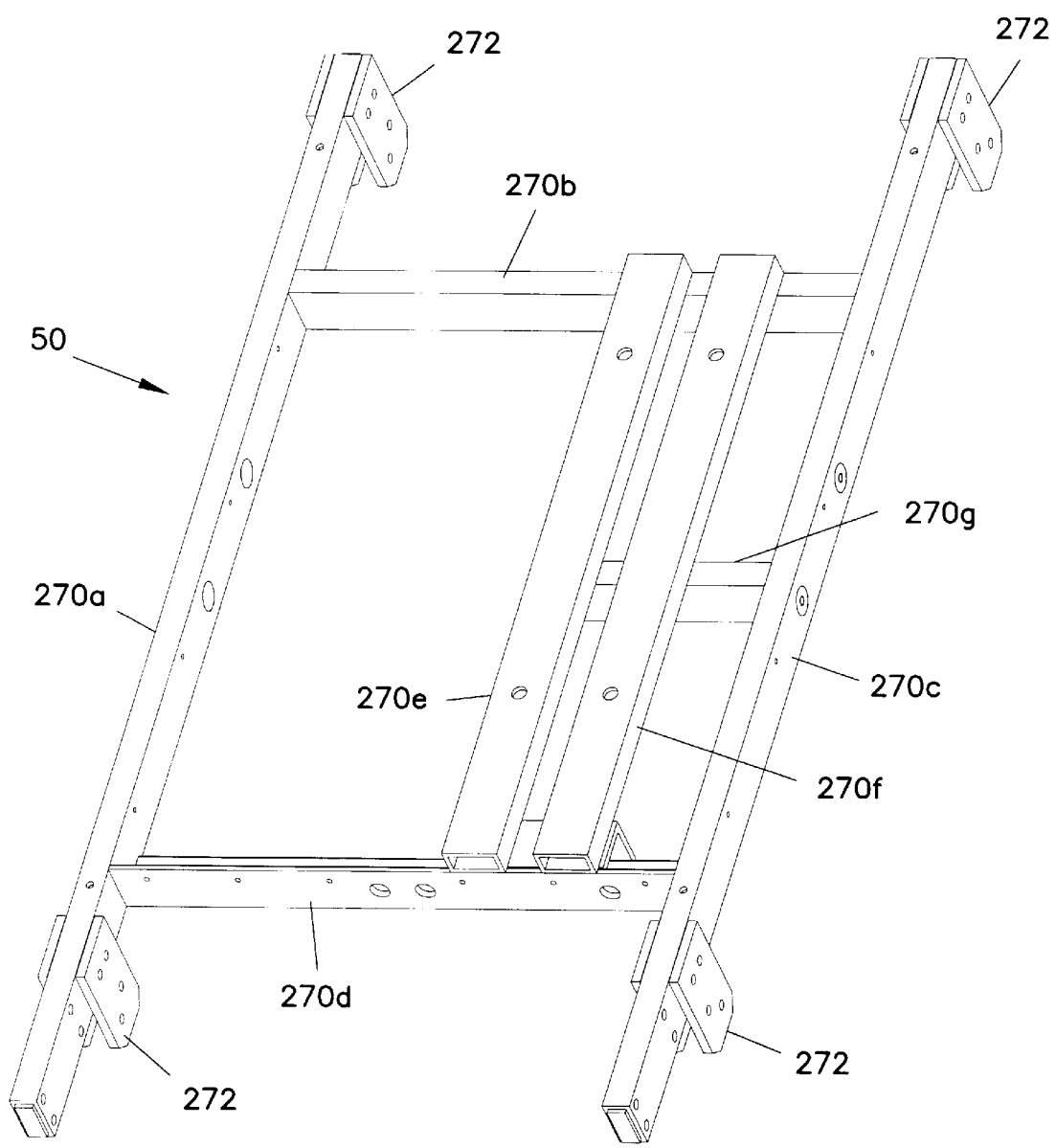
FIG. 21 is a perspective view of the frame of the apparatus shown in FIG. 2.

Referring now to FIG. 21, frame 50 is shown in greater detail. Various elongated members 270a–g are utilized to assemble frame 50. Frame 50 supports various components of apparatus 20 including control assembly 52 and lower tractor drive assembly 60. Brackets 272 mount to legs (not shown) for supporting members 270a–g above the ground.

Figure 22:
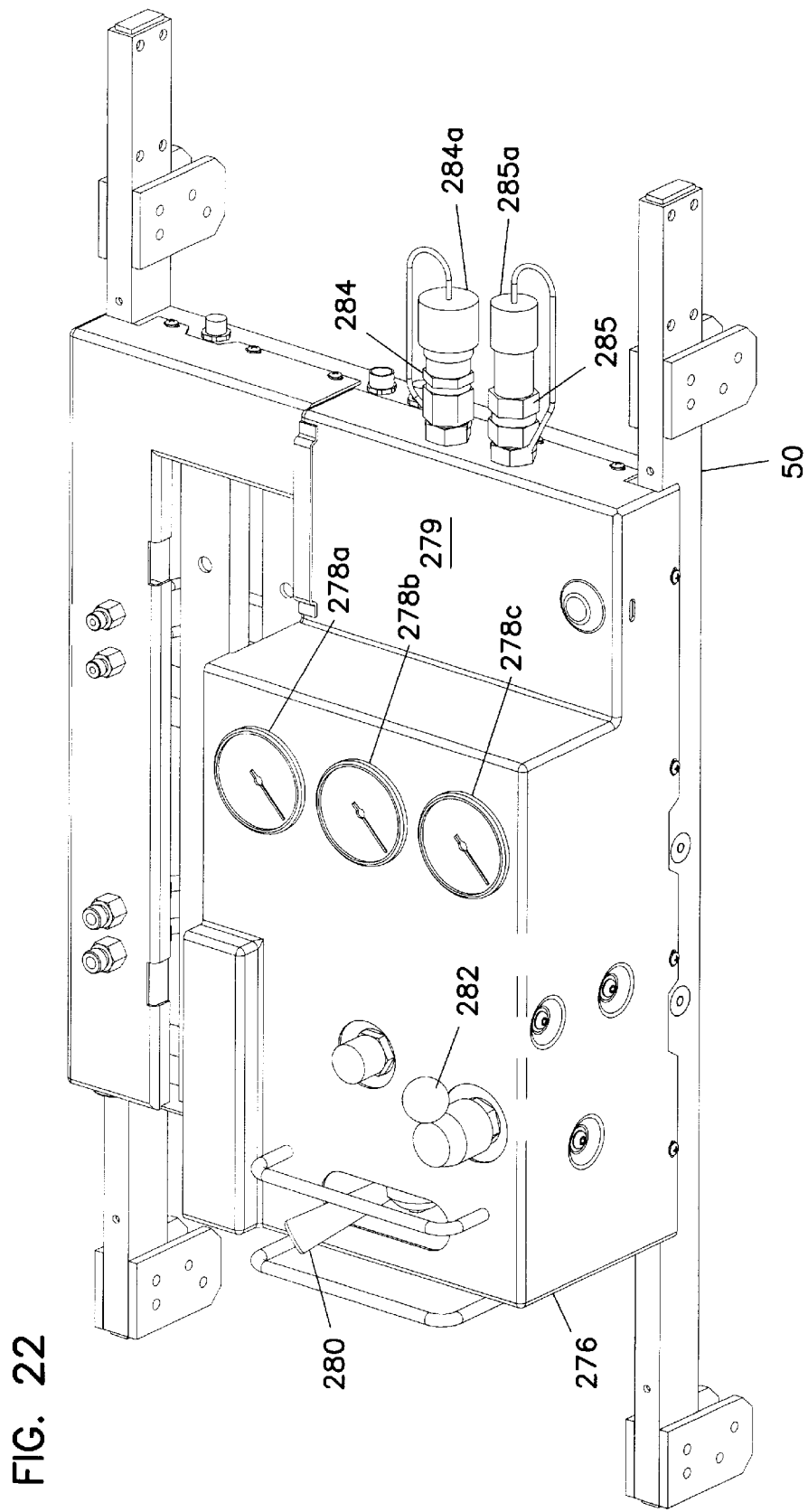
FIG. 22 is a perspective view of the frame of FIG. 21 including portions of the control system.
Figure 23:
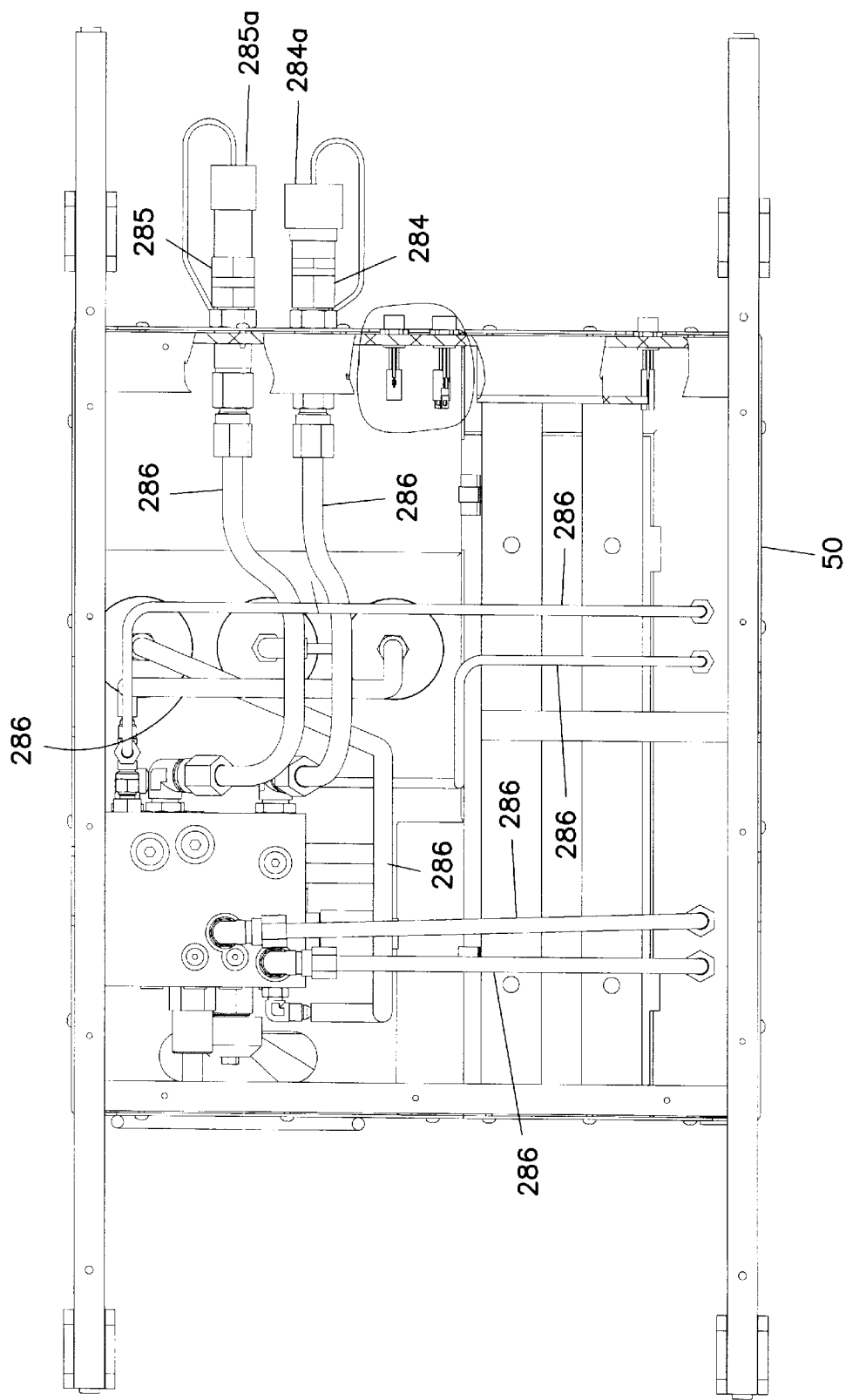
FIG. 23 is a bottom view of the frame and control system features shown in FIG. 22.

Referring now to FIGS. 22 and 23, various hydraulic control components of control assembly 52 are also illustrated with respect to frame 50. A hydraulic control module 276 includes various gauges 278a–c for display of clamp cylinder system hydraulic pressure, system air pressure, and motor system hydraulic pressure. Control module 276 also includes a manually operated motor speed control lever 280 for controlling the speed of motors 64, 66 via hydraulic directional control valve 254 (FIG. 20). Control module 276 also includes a manually operated up/down control lever 282 for controlling clamp cylinder 70 via hydraulic directional control valve 258 (FIG. 20). Pressure line port 284 and return line port 285, both shown in FIGS. 22 and 23 with protective caps 284a, 285a connect control module 276 to hydraulic pump 248. The various hydraulic lines 286 between motors 64, 66, clamp cylinder 70 and gauges 278a, c are shown at least in part by reference to FIG. 23, and also FIGS. 5 and 6, in accordance with the hydraulic schematic of FIG. 20. Control module 242 is preferably separate from hydraulic control module 276, and preferably resides in space 279 on hydraulic control module 276. By making separate modules, module 240 can be detached as desired, such as protect it from the weather during periods of nonuse.

Figure 24:
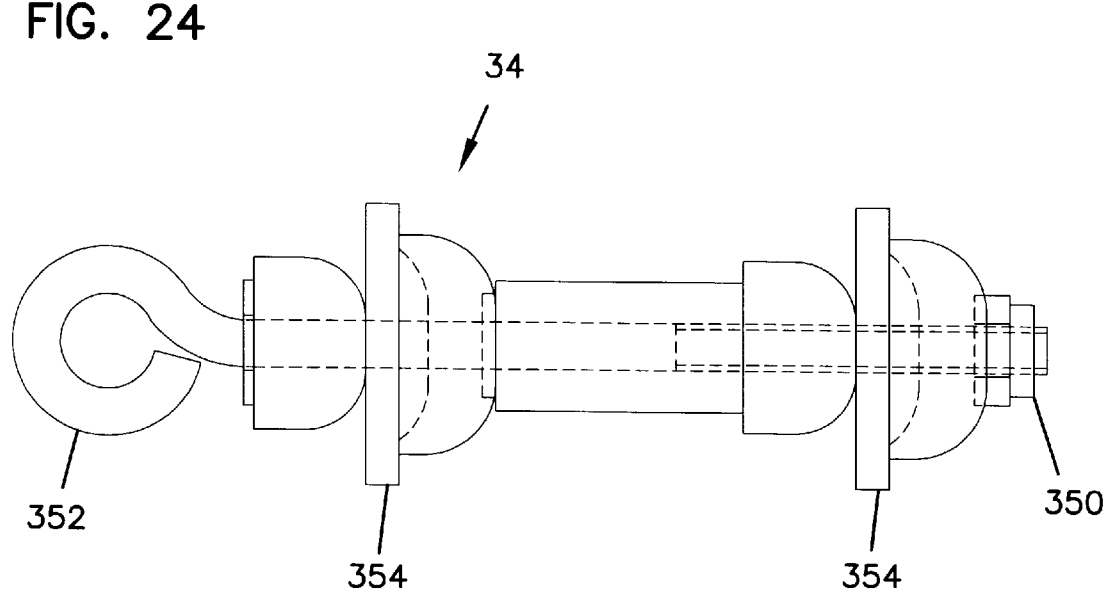
FIG. 24 is a side view of an embodiment of a missile usable with the cable conveying apparatus of FIG. 2.

Referring now to FIG. 24, an example missile 34 is shown in greater detail. Missile 34 includes a tip 350, and a connection end 352 for connecting to cable 22. Typically a swivel is connected to cable 22, and missile 34 connects to the swivel. Disposed between tip 350 and connection end 352 is at least one seal 354 for sealing an interior of duct 26. Missile 34 has two seals 354. Preferably, seals 354 are sized so that missile 34 generates sufficient pressure to move through duct 26 in order to pull cable 22 therethrough, but the seals are not so tight with duct 26, such that it frequently become stuck when it would encounter the common irregularities within duct 26. Silicone rubber discs for seals 354 work well. Other sealed missiles besides missile 34 are possible for use with apparatus 20.

Apparatus 20 with control assembly 52 prevents damage to cable 22 being installed into the conduit. Damage to fiber optic cables can occur when cable 22 slows down or stops moving in the duct 26. The damage to the cable can be due to column failure, exceeding minimum bend radii, or the pushing device slipping on the cable jacket thus causing wear of the cable jacket. The control system accomplishes this by monitoring slippage by comparing the speed of the pushing device versus actual cable speed. If the control system senses a difference between the two speeds, it will then stop the pushing device by activating a bypass valve (solenoid 244). By stopping the pushing device when a speed differential (slippage between pusher and cable) is sensed, the wear to the cable jacket will be minimal. To ensure that slippage between the pushing device and the cable occurs, the cylinder 70 at a predetermined and fixed pressure controls the amount of clamp force applied to the cable. The amount of down force is directly proportional to the amount of pushing force that can be applied to the cable in accordance with the equation $F=\mu N$, where:

$\mu$=coefficient of friction;

N=normal force or clamp force;

F=pushing force.

By limiting the clamping force, the pushing device will slip on the cable before it can exert enough force to cause a column failure. This also ensures that the clamping force does not exceed the compressive limits of the cable. Since slip damage can occur before a complete stoppage of cable 22 occurs, monitoring relative speeds leads to an advantageous apparatus 20.

The control system also preferably provides two additional safety features. High speed protection is provided if the cable exceeds a speed, such as 300 feet/minute (91 meters/minute) in the preferred embodiment, then the control system will stop the pushing device by activating the bypass valve, thus stopping the cable. The high speed condition will usually indicate a duct joint failure or out of control cable situation. Low speed protection is provided if the cable speed falls below a minimum, such as 25 feet/minute (7.6 meters/minute) in the preferred embodiment, then the control system will stop the pushing device by activating the bypass valve thus stopping the cable. The underspeed condition will usually indicate an instant blockage in the duct system. While low speed monitoring is important, low speed monitoring will not prevent some cable damage situations which are addressed by the cable slippage monitoring system described above.

Some working examples follow: The chain pad material in the preferred embodiment is a cast polyurethane, having a 95 Durometer shore "A". An example material is compound 6321-A-50D. Example fiber optic cable includes a polyethylene (medium density) outer jacket. It has been observed that an approximate coefficient of friction between these two materials is about 0.393. Examples of cable 22 include cable ranging from ⅜ inches (10 millimeters) to 1 and ¼ inches (32 millimeters) in diameter. Pirelli Cable Corporation, Outside Plant, Unarmored Loose Tube cable or Customer Premise, Ribbon In Loose Tube cable are appropriate cable types for installation with apparatus 20. In the case of Pirelli Unarmored Loose Tube cable, the following data* is provided:

| | | DESIGN PARAMETERS | | | | | |
|---|---|---|---|---|---|---|---|
| PARAMETER/FIBER RANGES | | 4–36 | 38–72 | 74–96 | 98–120 | 122–144 | 146–216 |
| Number of positions | | 6 | 6 | 8 | 10 | 12 | 18 |
| Outside | mm | 12.0 | 13.2 | 14.9 | 16.6 | 18.5 | 18.9 |
| Diameter | in | 0.47 | 0.52 | 0.59 | 0.65 | 0.73 | 0.74 |
| Cable | kg/km | 123 | 148 | 188 | 232 | 289 | 298 |
| Weight | lb/1000 ft | 83 | 99 | 126 | 156 | 194 | 200 |
| Pulling | mm | 18.6 | 18.6 | 18.6 | 20.6 | 20.6 | 23.1 |
| Eye O.D. | in | 0.73 | 0.73 | 0.73 | 0.81 | 0.81 | 0.91 |
| Max | mtr | 12000 | 12000 | 12000 | 12000 | 10000 | 10000 |
| Length | ft | 39370 | 39370 | 39370 | 39370 | 32808 | 32808 |

-continued

PERFORMANCE SPECIFICATIONS

| MEASUREMENT | | UNITS | SPECIFICATIONS |
|---|---|---|---|
| Bend Radius | | | |
| Dymanic | | X Cable O.D. | 20 |
| Static | | X Cable O.D. | 10 |
| Tensile Rating | | | |
| Installation | | N (lb) | 2700 (600) |
| Residual | | N (lb) | 440 (100) |
| Crush Resistance | | N/cm (lb/in) | 220 (125) |
| Temperatures | Storage | ° C. | −50 to +70 |
| | | ° F. | −60 to +160 |
| | Installation | ° C. | −30 to +60 |
| | | ° F. | −20 to +140 |
| | Operation | ° C. | −40 to +70 |
| | | ° F. | −40 to +160 |

For Pirelli Ribbon In Loose Tube cable the following data* is provided:

DESIGN PARAMETERS

| PARAMETER/FIBER RANGES | | 288–432 |
|---|---|---|
| Number of Positions | | 6 |
| Outside | mm | 23.0 |
| Diameter | m | 0.91 |
| Cable | kg/km | 460 |
| Weight | lb/1000 ft | 310 |
| Pulling Eye | mm | 25.6 |
| O.D. | m | 1.01 |
| Max Length | mtr | 3000 |
| | ft | 9842 |

PERFORMANCE SPECIFICATIONS

| MEASUREMENT | | UNITS | SPECIFICATION |
|---|---|---|---|
| Bend Radius | | | |
| Dynamic | | X Cable O.D. | 20 |
| Static | | X Cable O.D. | 10 |
| Tensile Rating | | | |
| Installation | | N (lb) | 2700 (600) |
| Residual | | N( lb) | 440 (100) |
| Crush Resistance | | N/cm (lb/in) | 440 (250) |
| Temperatures | Storage | ° C. | −50 to +70 |
| | | ° F. | −60 to +160 |
| | Installation | ° C. | −30 to +60 |
| | | ° F. | −20 to +140 |
| | Operation | ° C. | −40 to +70 |
| | | ° F. | −40 to +160 |

*Data taken from data sheets from Pirelli Cables North America - Communications Division, 700 Industrial Drive, Lexington, South Carolina, U.S.A. 29072-3799.

Examples of duct 26 range from 1 inch (25 millimeters) up to 2 inches (51 millimeters) in diameter, as well as SDR 11 and 13.5. Typically, pneumatic pressure is at 135 pounds per square inch (psi) maximum and generates at least 175 cubic feet/minute (cfm) (5 cubic meters/minute) minimum and 375 cfm (11 cubic meters/minute) maximum. The hydraulic operating pressure is typically at 1500 psi (103 bar) maximum, with an 8 gallons/minute (30 liters/minute) flow maximum and 5 gallons/minute (19 liters/minute) flow minimum. Example sensors 112, 184 include Red Lion part number MP37CA00 magnetic pickups. Example sprockets 108, 182 include 60 teeth, with a 2.570 inch diameter, from Madison Electric part number 4000– 0870. The elongated regions 100, 134 of each drive chain are about 8 inches (203 millimeters) long and the hydraulic clamp cylinder pressure is set so as to develop about 100 lb/in (176 N/cm) of compression force on the cable.

Alternatively, it is to be appreciated that cable conveying apparatus 20 of the present invention can be used as a puller which utilizes the motive force in a pulling manner by frictionally engaging cable 22 with drive assembly 40. The jacket protection features of apparatus 20 are equally advantageous whether apparatus 20 is a puller or a pusher.

It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

what is claimed is:

1. An apparatus for conveying a cable, such as through a conduit, the cable having a longitudinal axis extending in the longitudinal direction of the cable, the apparatus comprising:

a drive assembly including a moveable drive member for frictionally engaging an outside surface of the cable and for applying a friction force so as to move the cable in the longitudinal direction;

a drive assembly sensor and signal generator for sensing movement of the moveable drive member of the drive assembly, and for generating a signal indicative of the sensed movement of the drive member;

a cable sensor and signal generator for sensing movement of the cable, and for generating a signal indicative of the sensed movement of the cable; and a control system which controls movement of the movable drive member of the friction drive assembly, the control system including circuitry for receiving the signal from the drive assembly sensor and signal generator and the signal from the cable sensor and signal generator, the control system including further circuitry for comparing the signals so as to compare movement of the drive assembly and the cable over time wherein a drive assembly shut off signal is generated by the control system if a predetermined speed difference exists between the drive assembly and the cable.

2. The apparatus of claim 1, further comprising an air pressure generator.

3. The apparatus of claim 1, further comprising a high speed cable shut off system.

4. The apparatus of claim 1, further comprising a low speed cable shut off system.

5. The apparatus of claim 4, further comprising a high speed cable shut off system.

6. The apparatus of claim 1, wherein the drive assembly includes two moveable drive members, wherein each moveable drive member includes a tractor drive assembly, wherein each tractor drive assembly includes a continuous chain, and a plurality of cable engaging pads mounted to the chain.

7. The apparatus of claim 6, wherein the drive assembly includes a hydraulic cylinder holding the tractor drive assemblies at a spaced apart distance.

8. The apparatus of claim 6, wherein the drive assembly includes a hydraulic motor driving each tractor drive assembly.

9. The apparatus of claim 8, wherein the drive assembly includes a hydraulic cylinder holding the tractor drive assemblies at a spaced apart distance.

* * * * *